United States Patent
Komatsu

(10) Patent No.: US 10,430,655 B2
(45) Date of Patent: Oct. 1, 2019

(54) AUGMENTED REALITY INFORMATION PROCESSING SYSTEM AND AUGMENTED REALITY DISPLAY CONTROL METHOD WITH SPACE INFORMATION CONVERSION AND DISPLAY CONTROL FEATURES

(71) Applicant: FUJITSU LIMITED, Kawasaki-shi, Kanagawa (JP)

(72) Inventor: Ryouta Komatsu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 284 days.

(21) Appl. No.: 14/710,788

(22) Filed: May 13, 2015

(65) Prior Publication Data
US 2015/0363076 A1  Dec. 17, 2015

(30) Foreign Application Priority Data

Jun. 13, 2014 (JP) ................. 2014-122282

(51) Int. Cl.
  *G06K 9/00* (2006.01)
  *G06F 3/0484* (2013.01)
  (Continued)

(52) U.S. Cl.
  CPC ..... *G06K 9/00671* (2013.01); *G06F 3/04817* (2013.01); *G06F 3/04842* (2013.01);
  (Continued)

(58) Field of Classification Search
  CPC ............. G06F 3/04842; G06F 3/04817; G06T 19/006; G06K 9/00671; G06K 9/00624;
  (Continued)

(56) References Cited

U.S. PATENT DOCUMENTS

2004/0233171 A1* 11/2004 Bell .................. G06T 15/40
  345/168
2007/0074159 A1  3/2007 Ueno
  (Continued)

FOREIGN PATENT DOCUMENTS

JP  10-187747  7/1998
JP  2002-230586  8/2002
  (Continued)

OTHER PUBLICATIONS

Office Action dated Jan. 30, 2017 in Australian Patent Application No. 2015202589.
  (Continued)

*Primary Examiner* — Kieu D Vu
*Assistant Examiner* — Roberto Borja
(74) *Attorney, Agent, or Firm* — Xsensus LLP

(57) ABSTRACT

A system includes circuitry configured to: obtain an image, detect a specific object from the image, obtain space information indicating a first space which is set with reference to the specific object, calculate first area information based on a shape of the specific object in the image and the space information, the first area information corresponding to a first area in which the first space is projected onto the image, and control a display so as to display a content associated with the specific object in the first area based on the first area information.

18 Claims, 27 Drawing Sheets

(51) Int. Cl.
*G06F 3/0481* (2013.01)
*G06T 19/00* (2011.01)

(52) U.S. Cl.
CPC ..... *G06K 9/00201* (2013.01); *G06K 9/00624* (2013.01); *G06T 19/006* (2013.01); *G05B 2219/32014* (2013.01)

(58) Field of Classification Search
CPC ...... G05B 2219/32014; G02B 27/0172; G02B 2027/0138
See application file for complete search history.

(56) References Cited

U.S. PATENT DOCUMENTS

| | | | |
|---|---|---|---|
| 2010/0141648 | A1 | 6/2010 | Bell et al. |
| 2011/0161875 | A1 | 6/2011 | Kankainen |
| 2012/0206452 | A1* | 8/2012 | Geisner ............... G02B 27/017 345/419 |
| 2012/0249741 | A1* | 10/2012 | Maciocci ............... G06F 3/011 348/46 |
| 2013/0114100 | A1* | 5/2013 | Torii ................... G06F 11/0733 358/1.14 |
| 2013/0335301 | A1* | 12/2013 | Wong ................. G02B 27/0093 345/8 |
| 2015/0070389 | A1 | 3/2015 | Goto et al. |
| 2015/0100327 | A1* | 4/2015 | Kelly .................... G06F 19/322 705/2 |
| 2015/0293660 | A1* | 10/2015 | Chiu .................... G06F 3/0488 715/769 |
| 2016/0189425 | A1* | 6/2016 | Li ........................ G11B 27/105 345/633 |

FOREIGN PATENT DOCUMENTS

| | | |
|---|---|---|
| JP | 2007-94449 | 4/2007 |
| JP | 2007-293895 | 11/2007 |
| JP | 2012-069126 | 4/2012 |
| JP | 2013-120606 | 6/2013 |
| JP | 2013-210793 | 10/2013 |
| WO | WO 02/093491 A1 | 11/2002 |
| WO | WO 2013/145536 A1 | 10/2013 |

OTHER PUBLICATIONS

Extended European Search Report dated Oct. 27, 2015 in Patent Application No. 15168122.8.
Jason Wither et al., "Annotation in Outdoor Augmented Reality", Computers & Graphics, vol. 33, No. 6, XP026791205, Dec. 1, 2009, pp. 679-689.
Applidium: "Too many pins on your map?", Jul. 23, 2013, XP055221210, Retrieved from the Internet: URL:http://web.archive.org/web/20130723104656/http://applidium.com/en/news/too_many_pins_on_your_map/, 5 pages.
Edward Rosten et al., "Real-Time Video Annotations for Augmented Reality", Advances in Visual Computing Lecture Notes in Computer Science, XP019025306, Jan. 1, 2005, pp. 294-302.
Fumihisa Shibata et al., "A View Management Method for Mobile Mixed Reality Systems", Virtual Environments 2008: 14th Eurographics Symposium on Virtual Environments, XP002655108, May 2008, 8 pages.
Office Action dated Aug. 9, 2016 in Australian Patent Application No. 2015202589.
Australian Office Action dated Apr. 24, 2017 in Patent Application No. 2015202589.
European Office Action dated May 24, 2017 in Patent Application No. 15168122.8.
Japanese Office Action dated Dec. 5, 2017 in Japanese Application No. 2014-122282 (with partial English Translation), 6 pages.
Office Action dated Nov. 17, 2017 in European Patent Application 15 168 122.8.
Extended European Search Report issued in corresponding European Application No. 18153396.9 dated Feb. 22, 2018.
Notification of Second Office Action issued in corresponding Chinese Application No. 201510319447.X dated Feb. 26, 2018 (with English translation).
Australian Office Action dated Aug. 1, 2018 in Patent Application No. 2017203098, 5 pages.
Australian Office Action dated Dec. 5, 2018 in Australian Application No. 2017203098, 6 pages.
Office Action of European Patent Application No. 18153396.9 dated Jul. 18, 2019, 5 pages.

* cited by examiner

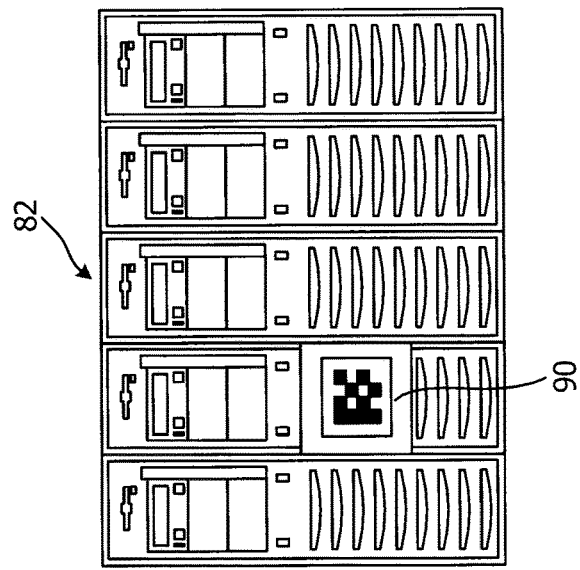
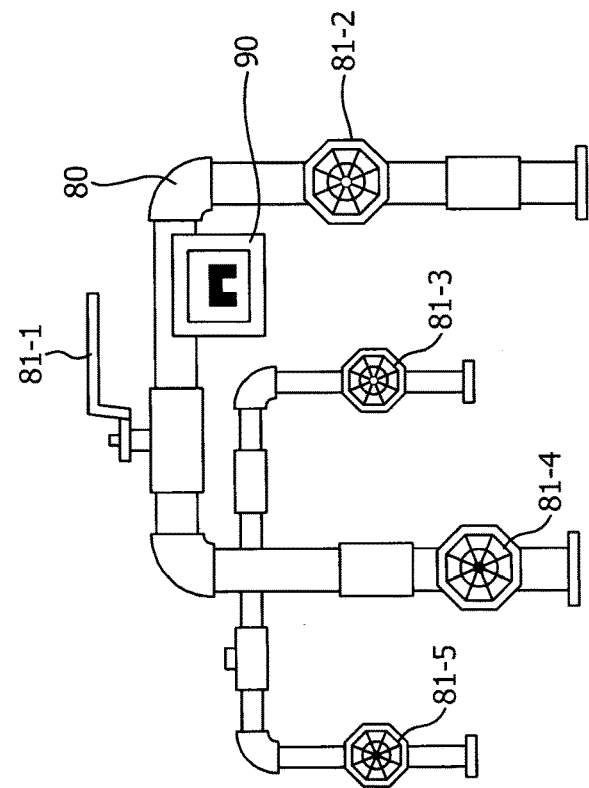

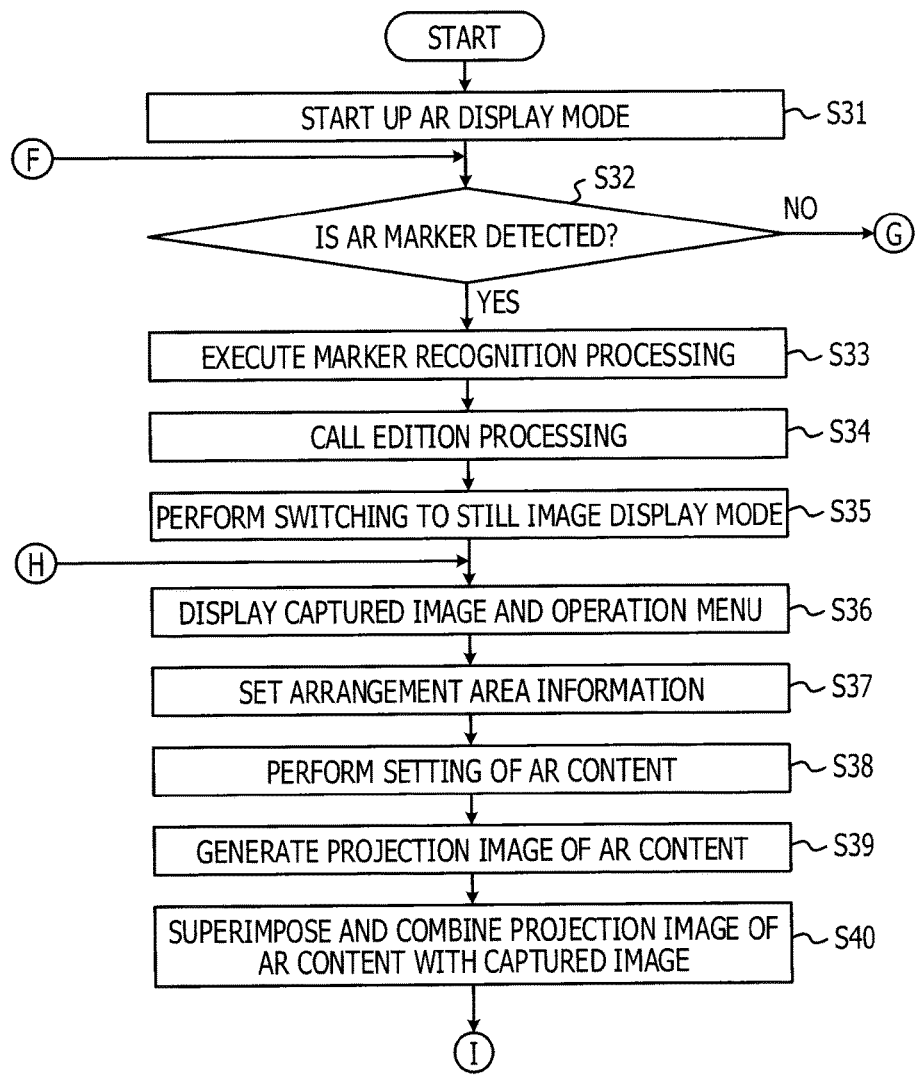

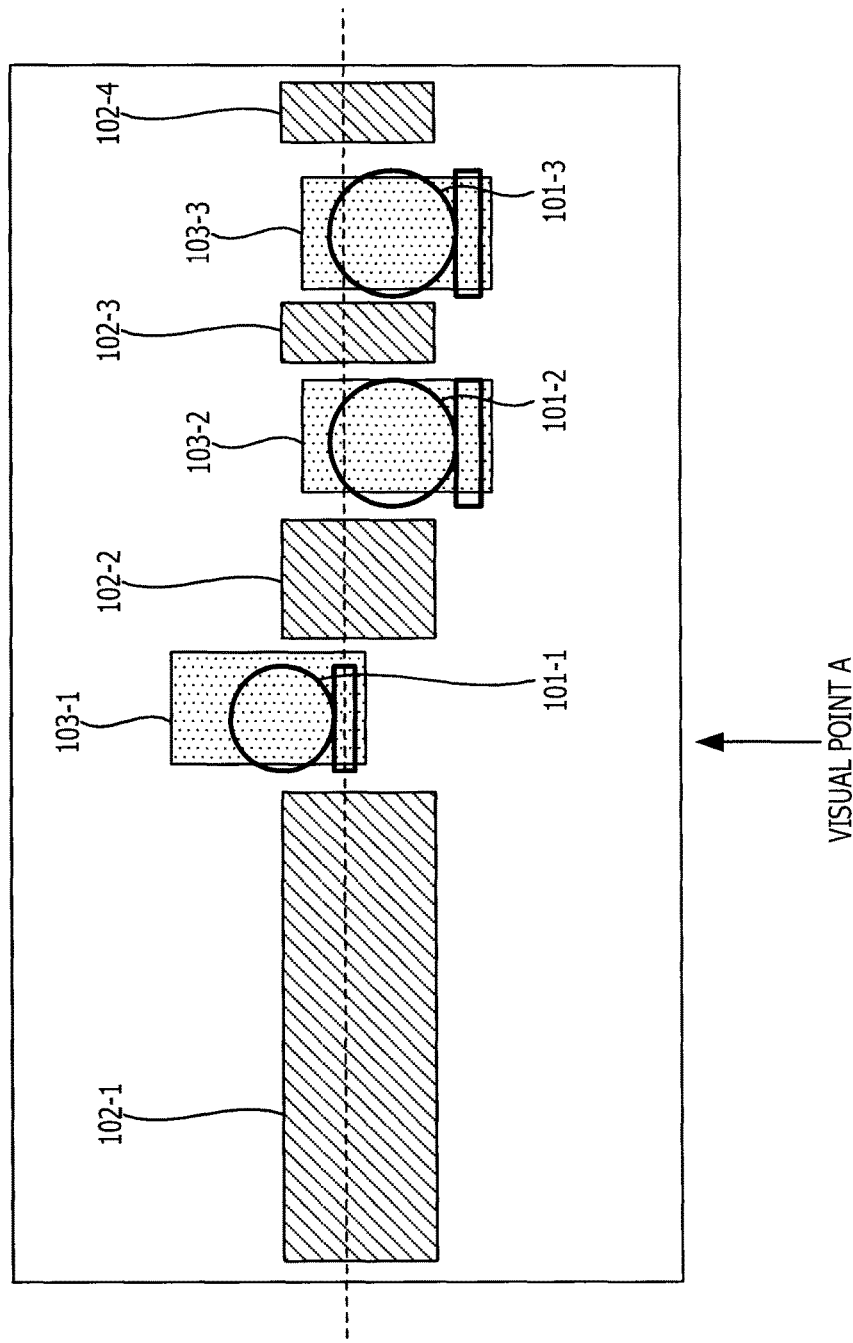

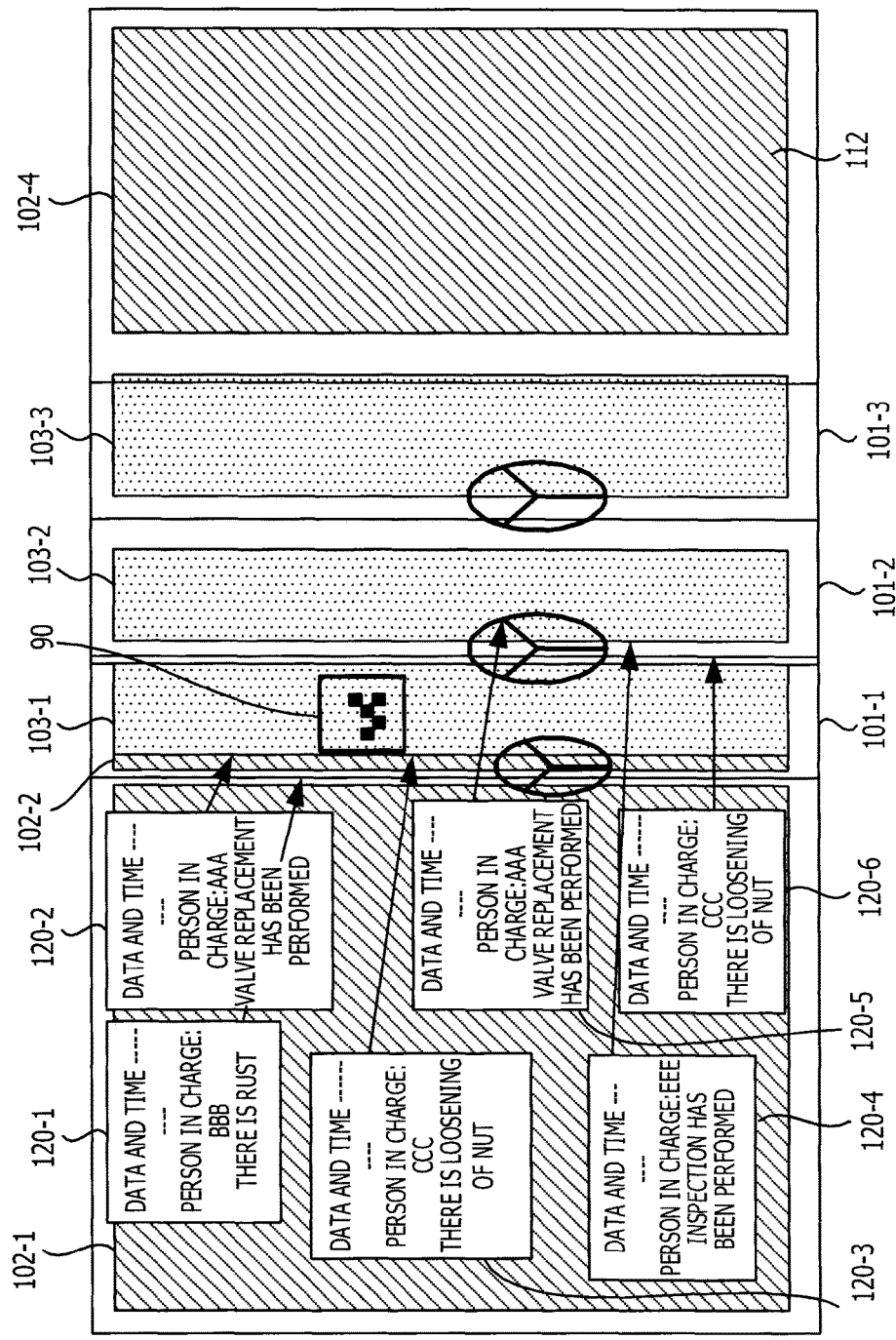

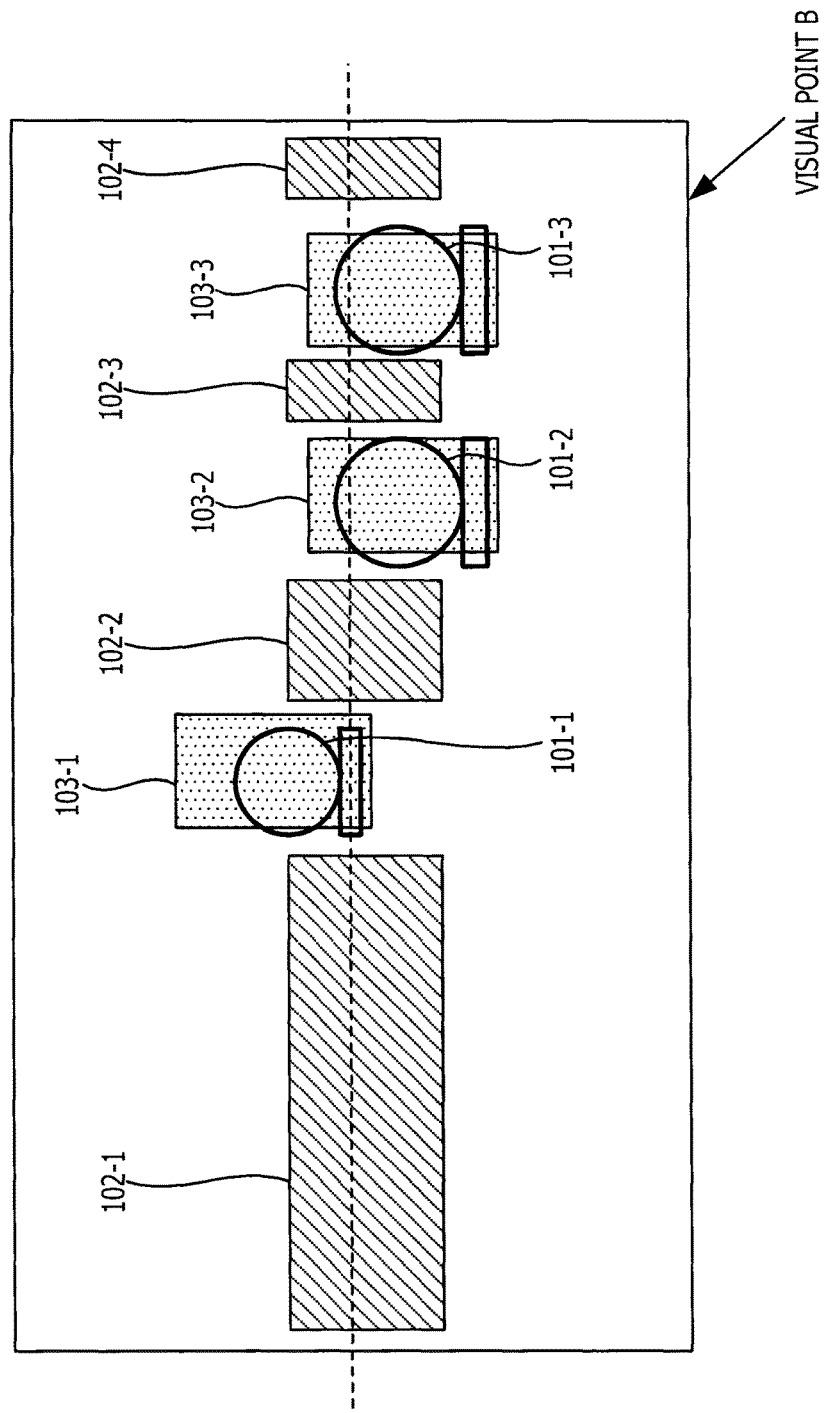

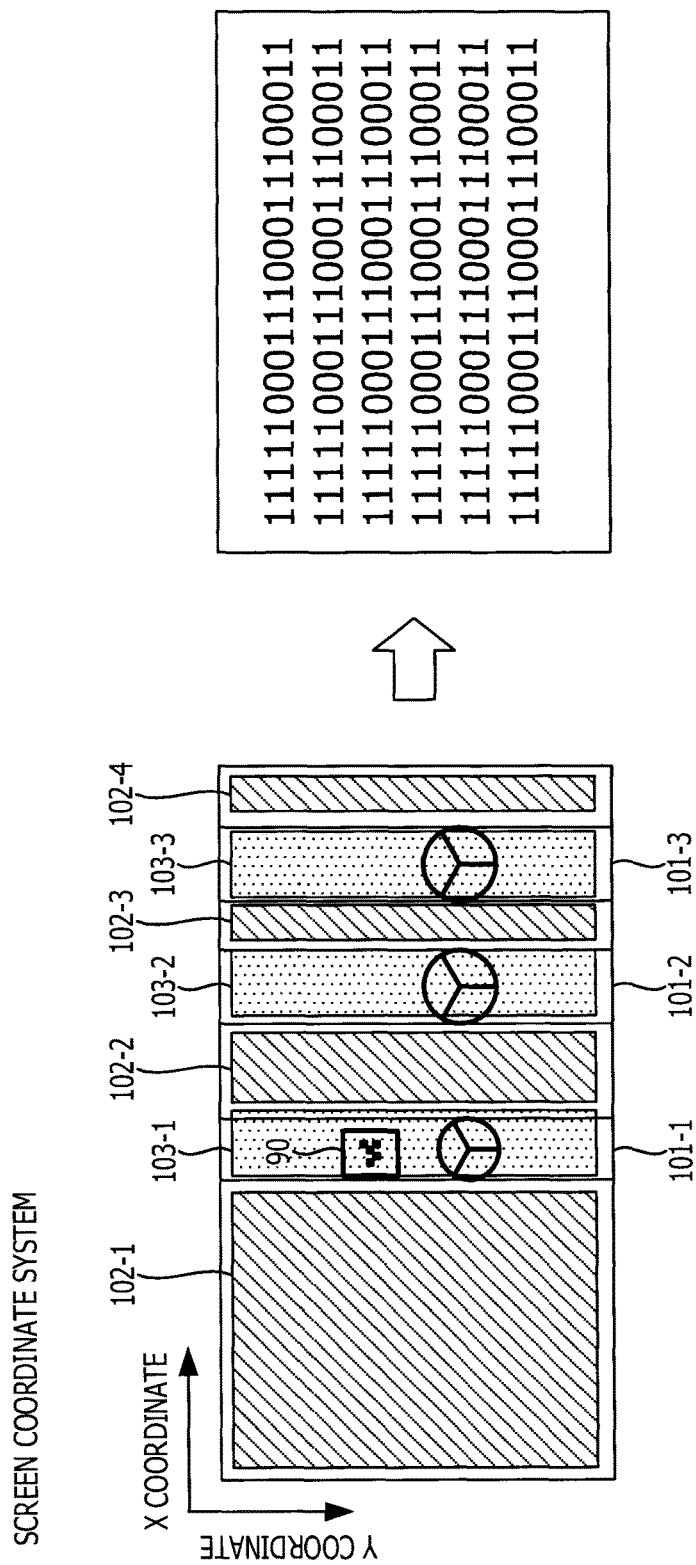

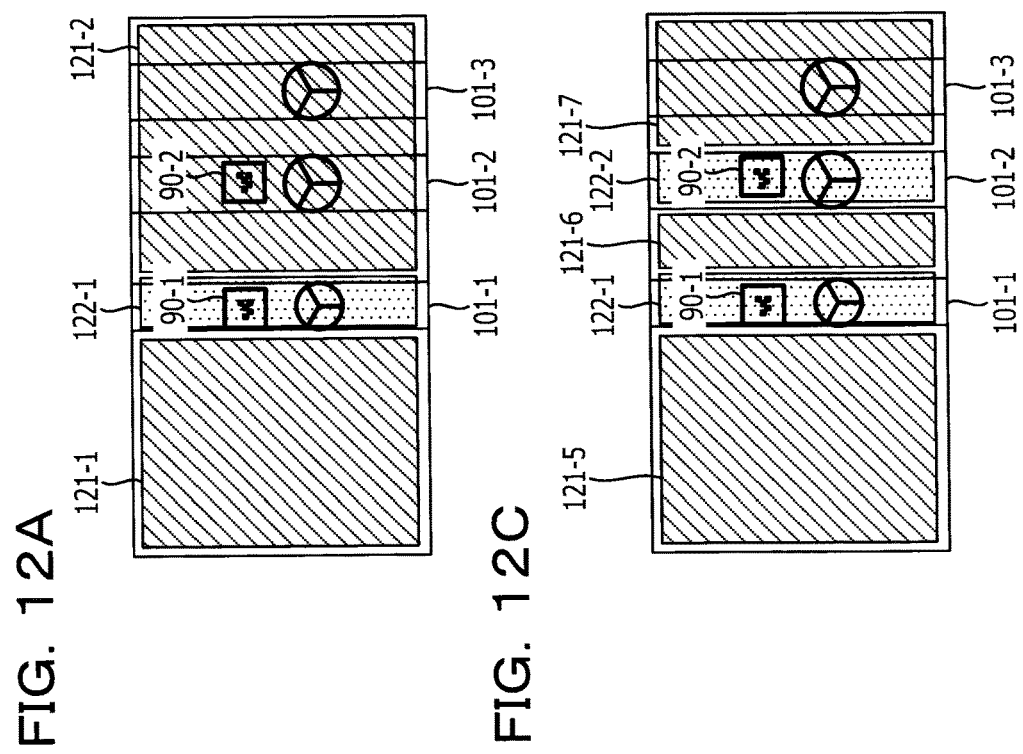

DISPLAY POSITION TABLE

| AR CONTENT | MARKER ID | DISPLAY AREA |
|---|---|---|
| SUPERPOSITION 1 | 1 | (TopLeft:(50,5), BottomLeft(50,50), TopRight:(100,5), BottomRight(100,50)) |
| SUPERPOSITION 2 | 1 | (TopLeft:(45,60), BottomLeft(45,150), TopRight:(105,60), BottomRight(105,150)) |

DISPLAY POSITION TABLE

| AR CONTENT | MARKER ID | DISPLAY AREA |
| --- | --- | --- |
| SUPERPOSITION 1 | 1 | (TopLeft:(50,5), BottomLeft(50,50), TopRight:(100,5), BottomRight(100,50)) |
| SUPERPOSITION 2 | 1 | (TopLeft:(45,60), BottomLeft(45,150), TopRight:(105,60), BottomRight(105,150)) |
| SUPERPOSITION 3 | 1 | (TopLeft:(150,5), BottomLeft(150,25), TopRight:(170,5), BottomRight(170,25)) |

DISPLAY POSITION TABLE

| AR CONTENT | MARKER ID | DISPLAY AREA |
|---|---|---|
| SUPERPOSITION 1 | 1 | (TopLeft:(50,5), BottomLeft(50,50), TopRight:(100,5), BottomRight(100,50)) |
| SUPERPOSITION 2 | 1 | (TopLeft:(45,60), BottomLeft(45,150), TopRight:(105,60), BottomRight(105,150)) |
| SUPERPOSITION 3 | 1 | (TopLeft:(150,5), BottomLeft(150,25), TopRight:(170,5), BottomRight(170,25)) |
| SUPERPOSITION 4 | 1 | (TopLeft:(155,65), BottomLeft(155,85), TopRight:(170,65), BottomRight(170,85)) |

AUGMENTED REALITY INFORMATION PROCESSING SYSTEM AND AUGMENTED REALITY DISPLAY CONTROL METHOD WITH SPACE INFORMATION CONVERSION AND DISPLAY CONTROL FEATURES

CROSS-REFERENCE TO RELATED APPLICATION

This application is based upon and claims the benefit of priority from the prior Japanese Patent Application No. 2014-122282 filed on Jun. 13, 2014, the entire contents of which are incorporated herein by reference.

FIELD

The embodiments discussed herein are related to an information processing device, and a display control program for displaying a content on an image.

BACKGROUND

An augmented reality (AR) technology is known by which display information is superimposedly displayed over a part of an image that has been captured by a camera (image-capturing unit) provided in a terminal device. A digital content that is an example of the display information displayed using the AR technology is called an AR content or the like. By displaying the AR content whose orientation and size has been adjusted in the captured image that is displayed on the screen, the terminal device may display the AR content as if the AR content exists in a space captured by the camera.

To the AR content, a positional relationship with a reference object (for example, an AR marker or the like) is defined. A positional relationship between the camera and the AR content is calculated based on a positional relationship between the reference object and the camera, and a positional relationship between the AR content and the reference object. An image of the AR content that is to be displayed on the screen is generated by projecting the AR content in a direction that corresponds to the positional relationship between the camera and the AR content.

The AR content such as a superimposed image, which is displayed based on the AR marker recognized by the terminal device, includes a content that is registered by the operation of an operator or the like, in addition to a content that is registered by the operation of an administrator in advance. Due to registration operations, the users such as the administrator and the operator may set the AR content at a relative position from the AR marker. This technique is disclosed in Japanese Laid-open Patent Publication No. 2007-293895.

SUMMARY

According to an aspect of the invention, a system includes circuitry configured to: obtain an image, detect a specific object from the image, obtain space information indicating a first space which is set with reference to the specific object, calculate first area information based on a shape of the specific object in the image and the space information, the first area information corresponding to a first area in which the first space is projected onto the image, and control a display so as to display a content associated with the specific object in the first area based on the first area information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A and 6B are diagrams illustrating examples in which an AR marker is provided on an actual object;
FIGS. 8A and 8B are flowcharts illustrating an example of display control processing in a second embodiment;
FIGS. 10A, 10B, 10C, and 10D are diagrams illustrating display examples of AR contents;
FIG. 11 is a diagram illustrating a specific example of a display availability map;
FIGS. 12A, 12B, 12C, and 12D are diagrams illustrating generation examples of an integrated display availability map.

DESCRIPTION OF EMBODIMENTS

When a number of AR contents that use an identical reference object as a reference exist, there is not enough display space on the screen, so that projection images of the AR contents are displayed so as to overlap with each other. For example, even in a case in which the positions at the plurality of AR contents are arranged so as not to overlap with each other are set in advance, when the reference object is captured from another point (location), the AR content groups are displayed so as to overlap with each other. For example, when a plurality of users adds an AR content at any time, it is difficult to adjust the position of a desired AR content so that the AR content is not overlapped with other AR contents set by other users. In addition, when the position of the AR content is adjusted on the system side automatically, a target object in the image, on which the user focuses attention is covered by the AR content.

An object of an embodiment is to display superimposed display information appropriately.

Figure 1:
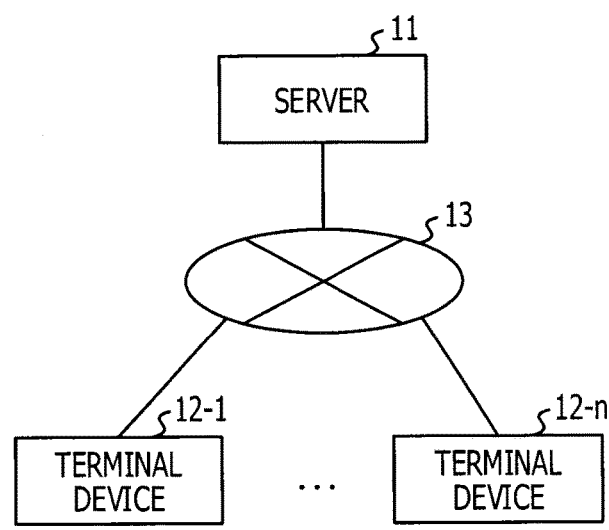
FIG. 1 is a diagram illustrating an example of a schematic configuration of an information processing system.

Embodiments are described with reference to drawings.
<Schematic Configuration Example of Information Processing System>
FIG. 1 is a diagram illustrating an example of a schematic configuration of an information processing system. The information processing system 10 illustrated in FIG. 1 includes a server 11 as an example of an information processing device, and one or a plurality of terminal devices 12-1 to 12-*n* (hereinafter collectively referred to as "terminal device 12" as appropriate). The server 11 and each of the terminal devices 12 are connected to each other, for example, so as to perform transmission and reception of data through a communication network 13.

The server 11 manages an AR marker as an example of a reference object, one or a plurality of AR contents that are registered so as to be associated with identification information (for example, marker ID) of each of the AR markers, arrangement area information (arrangement-enabled area (first space), arrangement-disabled area (second space)), and the like. The AR marker is, for example, a sign that is used to specify various pieces of content information such as AR contents and the like, the positions of the AR contents that are to be displayed, and the like. The AR marker is, for example, an image, an object, or the like in which a certain design, a character pattern, or the like is formed in a certain area such as a two-dimensional code, but the embodiment is not limited to such a case.

The AR content is, for example, a model data or the like of a three-dimensional object that is arranged on a three-dimensional virtual space corresponding to the real space, and is, for example, display information (object information) that is displayed so as to be superimposed over an image captured by the terminal device 12. In addition, the AR content is displayed, for example, at a position that has been set by relative coordinates (marker coordinate system) using an AR marker included in the captured image as a reference. The AR content in the embodiment is associated with a marker ID or the like, and includes, for example, various forms such as a text, an icon, animation, a mark, a design, an image, and a movie. In addition, the AR content is not limited to the content that is output so as to be displayed, and may be, for example, information such as audio.

The arrangement area information is, for example, information that is used to control the AR content having been associated with the marker ID of the AR marker in the image that is obtained by capturing the AR marker on the actual space to be displayed so as to be superimposed over the image. The arrangement area information includes, for example, one of or both of a three-dimensional area in which the AR content is allowed to be arranged in the image (first space, arrangement-enabled area), and a three-dimensional area in which the superimposed AR content is not allowed to be displayed (second space, arrangement-disabled area). The arrangement area information may also be two-dimensional information.

The arrangement-enabled area (first space) is, for example, an object and a space that the user does not regard as a focus target in the captured space, and is, for example, a space (area) that corresponds to a wall, a floor (ground), or a ceiling (sky) that is not an inspection target, but the embodiment is not limited to such a case. In addition, the arrangement-disabled area (second space) is, for example, an object and a space that the user regards as a focus target in the captured space, and is, for example, a space or the like that corresponds to a piping, a server, or the like being an inspection target object, but the embodiment is not limited to such a case. The arrangement area information (arrangement-enabled area, arrangement-disabled area) is set, for example, by the relative coordinates (marker coordinate system) using the AR marker as a reference. The marker coordinate system is, for example, a three-dimensional space coordinate system (X, Y, Z), but the embodiment is not limited to such a case, and the marker coordinate system may also be a two-dimensional plane coordinate system (X, Y).

The server 11 performs registration of information on the AR marker, which is obtained from the terminal device 12 (for example, a marker ID, location information of the AR marker, and the like), and the arrangement area information that has been set by the relative position coordinates in which the position of the AR marker is used as a reference, for example, by setting processing (authoring processing) of the AR content in the terminal device 12. In addition, when the server 11 obtains setting information of one or a plurality of AR contents that correspond to the marker ID, from the terminal device 12, by the authoring processing in the terminal device 12, the server 11 performs registration and management of the AR content information (for example, an AR content ID, a content type, a size, a rotation angle, character information, and the like).

In addition, when the server 11 receives an obtaining request of arrangement area information, an obtaining request of an AR content, and the like, from the terminal device 12, the server 11 extracts the corresponding information with reference to the arrangement area information and the AR content that have been registered in advance, using the marker ID transmitted from the terminal device 12. In addition, the server 11 transmits the extracted information to the terminal device 12 that has issued the obtaining request.

The embodiment is not limited to such a case, and for example, the server 11 receives a marker ID, location information of the terminal device 12, an image obtained by capturing the AR marker, and the like, from the terminal device 12, and may perform display control of the AR content using arrangement area information that corresponds to the marker ID, on the server 11 side. In that case, the server 11 transmits the controlled display content (for example, an image or the like that is obtained by superimposing the AR content over a certain position), to the terminal device 12.

The server 11 may be, for example, a personal computer (PC) or the like, but the embodiment is not limited to such a case, and the server 11 may be, for example, a cloud server or the like that is constituted by cloud computing including one or more information processing devices.

The terminal device 12 captures the AR marker that is provided in the vicinity of a target object on the actual space (for example, a management (inspection) target object or the like such as a piping, a server rack, or the like), by the image-capturing unit such as a built-in camera. In addition, the terminal device 12 recognizes the AR marker from the captured image, a movie, or the like (hereinafter referred to as "captured image"), and sets arrangement area information (arrangement-enabled area, arrangement-disabled area) of the AR content using the capturing position of the AR marker as a reference so as to be associated with the marker ID that is obtained by marker recognition. In addition, the terminal device 12 sets the marker ID so as to be associated with the AR content. In addition, the terminal device 12 registers the marker ID, the arrangement area information, and the AR content, to the server 11.

In addition, the terminal device 12 obtains the marker ID by marker recognition, from the captured image by the image-capturing unit, and issues an obtaining request of arrangement area information and an AR content, to the server 11, using the obtained marker ID. In addition, the terminal device 12 obtains the arrangement area information and the AR content that correspond to the marker ID, from the server 11, and displays the AR content so as to superimpose the AR content over the arrangement-enabled area of the captured image, using the obtained information. In this case, the terminal device 12 dynamically adjusts a projection area of the arrangement-enabled area for the captured image, which corresponds to the position of the AR marker and the visual point (camera position) at the present time. As a result, for example, even when the AR marker is detected from a position that is different from the position to which the arrangement area information has been set, appropriate display of the superimposed AR content may be performed automatically without adjustment by the user.

In addition, the terminal device 12 may transmit a marker ID of the AR marker that has been recognized by marker recognition, location information of the image-capturing, and information on the captured image, and the like, to the server 11, obtain a superimposed image of the AR content that has been processed on the server 11 side, and display the image on the screen.

The terminal device 12 is, for example, a tablet terminal, a smartphone, a personal digital assistants (PDA), a laptop PC, or the like, but the embodiment is not limited to such a case, and the terminal device 12 may be, for example, game equipment, a communication terminal such as a mobile phone, or the like.

The communication network 13 is, for example, the Internet, a local area network (LAN), or the like, but the embodiment is not limited to such a case. In addition, the communication network 13 may be a wired network or a wireless network, and may be a combination of a wired network and a wireless network.

The information processing system 10 illustrated in FIG. 1 is constituted by the server 11 and the terminal devices 12 at 1-to-n, but the embodiment is not limited to such a case, and the information processing system 10 may include, for example, a plurality of servers.

In the display control of the AR content using the information processing system 10 as illustrated in FIG. 1, arrangement area information of the AR content is set on the space that is included in the captured image, and the AR content is arranged in the arrangement-enabled area based on the set space. In addition, in the embodiment, depending on a positional relationship between an AR marker and a camera (image-capturing unit), a projection area for the image-capturing unit in a space of an arrangement target is adjusted, and the superimposed image is arranged in the adjusted projection area. In addition, in the embodiment, when a plurality of spaces of arrangement targets is defined, the superimposed image may be arranged by considering the projection areas that respectively correspond to the spaces.

<Function Configuration Example of Server 11>

Figure 2:
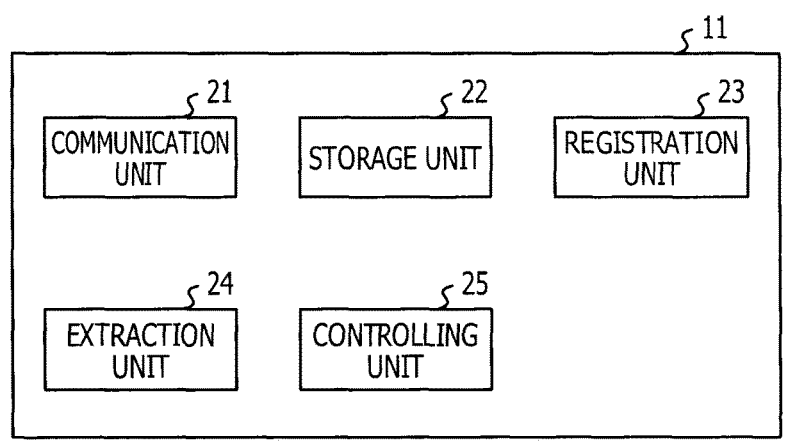
FIG. 2 is a diagram illustrating an example of a function configuration of a server.

A function configuration example of the above-described server 11 is described with reference to a drawing. FIG. 2 is a diagram illustrating the function configuration example of the server. The server 11 includes a communication unit 21, a storage unit 22, a registration unit 23, an extraction unit 24, and a controlling unit 25.

The communication unit 21 performs transmission and reception of data with the terminal device 12, a further computer or the like through the communication network 13. The communication unit 21 receives, for example, registration requests of a marker ID, arrangement area information (arrangement-enabled area, arrangement-disabled area), an AR content, and the like, from the terminal device 12. In addition, the communication unit 21 receives the marker ID and the like from the terminal device 12, and transmits the corresponding arrangement area information and AR content, to the terminal device 12.

The storage unit 22 stores various pieces of information that are desired for the display control processing in the embodiment. The storage unit 22 stores, for example, the arrangement area information, the AR content, and the like that have been associated with the marker ID, in the terminal device 12.

The registration unit 23 performs registration of various pieces of registration information and the like such as the arrangement area information, and the AR content that have been obtained from the terminal device 12. For example, the registration unit 23 performs registration of the marker ID, location information of the marker ID, arrangement area information that has been set so as to correspond to the marker ID, AR content information, and the like. The registered pieces of information are stored in the storage unit 22.

The extraction unit 24 extracts the corresponding arrangement area information, AR content information, and the like, with reference to the storage unit 22, based on the marker ID that has been obtained from the terminal device 12. The arrangement area information, the AR content, and the like having been extracted from the extraction unit 24 are transmitted to the terminal device 12 that has transmitted the marker ID through the communication unit 21.

When image-capturing location information, a captured image, and the like are obtained in addition to the marker ID, from the terminal device 12, the extraction unit 24 adjusts the arrangement-enabled area and the arrangement-disabled area for the captured image, based on the arrangement area information and the like that have been associated with the marker ID. At the time of area adjustment, for example, a display availability map or the like that is described later may be used, but the embodiment is not limited to such a case. In addition, based on the adjusted arrangement area information, the extraction unit 24 may superimpose the AR content that has been set for the marker ID, over the captured image, and transmit the superimposed image to the terminal device 12.

The controlling unit 25 controls the whole configurations in the server 11. For example, the controlling unit 25 executes, for example, pieces of processing such as transmission and reception of various pieces of information by the communication unit 21, data storage by the storage unit 22, registration of the arrangement area information, the AR content, and the like by the registration unit 23, and extraction of the arrangement area information, the AR content, and the like by the extraction unit 24. The content of the control that is performed by the controlling unit 25 is not limited to such a case.

<Example of Function Configuration of Terminal Device 12>

Figure 3:
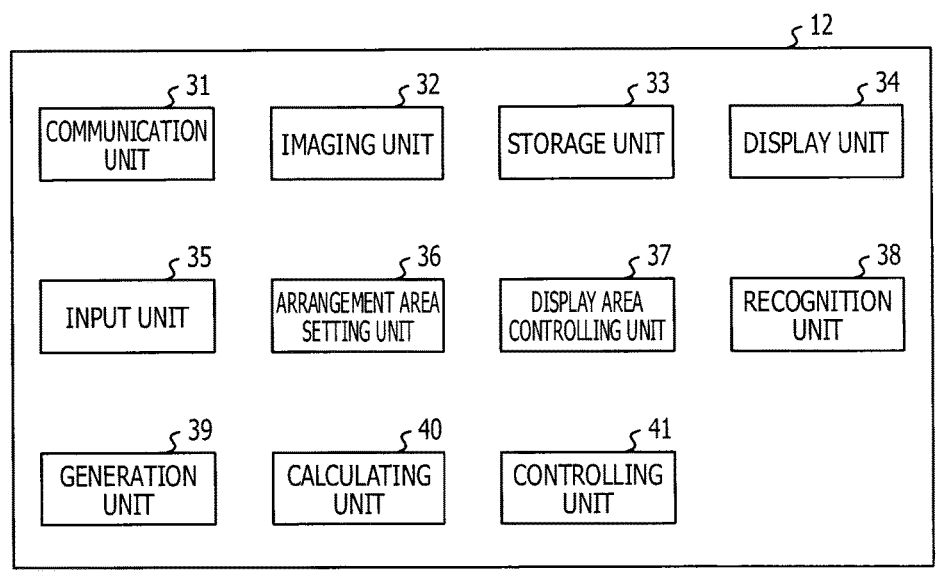
FIG. 3 is a diagram illustrating an example of a function configuration of a terminal device.

A function configuration example of the above-described terminal device 12 is described below with reference to a drawing. FIG. 3 is a diagram illustrating an example of the function configuration of the terminal device. The terminal device 12 includes a communication unit 31, an image-capturing unit 32, a storage unit 33, a display unit 34, an input unit 35, an arrangement area setting unit 36, a display area controlling unit 37, a recognition unit 38, a generation unit 39, a calculating unit 40, and a controlling unit 41.

The communication unit 31 performs transmission and reception of data with the server 11, a further computer, or the like through the communication network 13. For example, the communication unit 31 transmits various pieces of setting information such as AR content information, arrangement area information (arrangement-enabled area, arrangement-disabled area), and the like that are associated with a marker ID of an AR marker, to the server 11 or the like. In addition, the communication unit 31 transmits the marker ID that has been recognized by marker recognition, to the server 11, and receives arrangement area information and an AR content, and the like that correspond to the transmitted marker ID.

The image-capturing unit 32 captures an image at frame intervals that have been set in advance. The image-capturing unit 32 outputs the captured image to the controlling unit 41, and causes the storage unit 33 to store the image. In the following description, an example is described in which the captured image that has been obtained from the image-capturing unit 32 is set as an example of an input image, and the AR content is displayed so as to be superimposed over the input image, but the embodiment is not limited to such a case, and for example, an image that has been captured from a further device may be set as the input image.

The storage unit 33 stores various pieces of information desired for the display control in the embodiment (for example, arrangement area information, a display availability map, a display position table, an AR content, an icon, a thumbnail image, and the like). In addition, the storage unit 33 store, for example, pieces of information such as processing progress and a processing result, error information, and the like. The pieces of information include information having been obtained from the server 11 in addition to the information that has been set by the terminal device 12. In addition, the information having been obtained or set by the terminal device 12 may be deleted after the information has been transmitted to the server 11.

The display unit 34 displays a screen or the like used to perform registration of the arrangement area information and the AR content, on the captured image, based on the recognition (detection) result of the AR marker by the recognition unit 38. In addition, the display unit 34 displays an image obtained by superimposing the AR content that has been obtained so as to correspond to the marker ID of the AR marker, over the captured image, further various setting images, and the like.

The input unit 35 accepts an input of a content that corresponds to an operation by the user or the like. For example, when the display unit 34 is constituted by a touch-panel and the like, the input unit 35 may also obtain touch position coordinates on the touch-panel. The input unit 35 accepts, for example, information having been input by an operation to an input key or the like that has been displayed on the touch-panel. In addition, the input unit 35 may accept information having been input through a keyboard, an operation button, or the like provided in the terminal device 12 or provided externally.

The arrangement area setting unit 36 sets the arrangement area information of the AR content that has been associated with the marker ID of the AR marker (arrangement-enabled area, arrangement-disabled area), for the image that has been captured by the image-capturing unit 32, using location information of the AR marker included in the image as a reference. For example, when the AR content is displayed so as to be superimposed over an actual object that is included in the captured image (for example, an inspection target object or the like), the user installs the AR marker at a position in which the actual object is used as a reference (for example, in the vicinity of the actual object). In addition, when registration of the AR content that corresponds to the marker ID of the AR marker is performed, the arrangement-enabled area or the arrangement-disabled area is defined by the arrangement area setting unit 36. The defined arrangement area information and the like are registered to the server 11. For example, the arrangement area setting unit 36 may set the arrangement-enabled area for the captured image, and set an area (space) other than the set arrangement-enabled area as the arrangement-disabled area. In addition, for example, the arrangement area setting unit 36 may also set the arrangement-disabled area for the captured image, and set an area other than the set arrangement-disabled area as the arrangement-enabled area.

In addition, the arrangement area setting unit 36 may extract, for example, a feature point in the image by recognition processing of the captured image, and set an area in which a feature amount is small (for example, a wall, a floor, or the like) as the arrangement-enabled area. The feature point may be extracted based on a luminance value for the pixel, a luminance difference from a peripheral pixel, and the like, but the embodiment is not limited to such a case. In addition, the area in which a feature amount is small is, for example, an area in which the luminance difference is a certain value or less, an area in which an amount of feature points is a certain value or less, or the like, but the embodiment is not limited to such a case.

In addition, the arrangement area setting unit 36 manages information that indicates an arrangement area (for example, a coordinate value, or the like) by text data in advance, and may perform setting or the like of the arrangement area by obtaining the text data from the storage unit 33, the server 11, or the like, for example, when it is difficult for the user to perform the operation. A method from among the above-described methods may be set or changed by the user or the like, and setting and change may be performed based on a certain condition or the like.

The arrangement area information may be set in the three-dimensional space, or in the two-dimensional plane, and the three-dimensional space or the two-dimensional plane may be selectively used depending on setting of the user, a display target, or the like. For example, when the display target object (actual object) is in the three dimensional space, it is desirable that the space is defined by three-dimensional information (volume) in accordance with the original. In addition, when the display target object is in the two-dimensional plane, it is desirable that the plane area is defined by two-dimensional information (area) in accordance with the original, but the embodiment is not limited to such a case.

In addition, the arrangement area setting unit 36 may set a combination of AR markers when a plurality of AR markers is included in the captured image. In the setting of a combination of AR markers, for example, in a case in which a plurality of AR markers exists in the captured image, when AR markers are captured at the same time, it is specified whether or not feature information or the like of the common image is set.

The display area controlling unit 37 projects the set arrangement-enabled area or arrangement-disabled area that has been set by the arrangement area setting unit 36 onto the captured image, and obtains the projection area for the arrangement-enabled area or the arrangement-disabled area. The arrangement-enabled area or the arrangement-disabled area is stored in the server 11 or the storage unit 33. Thus, the display area controlling unit 37 refers to the storage unit 33 using the marker ID that has been recognized by the recognition unit 38, and obtains arrangement area information corresponding to the marker ID when there is the arrangement area information in the storage unit 33. In addition, the display area controlling unit 37 obtains the arrangement area information that corresponds to the marker ID by issuing an obtaining request to the server 11 or the like when there is no arrangement area information in the storage unit 33.

In addition, the display area controlling unit 37 performs display control to display the AR content within the projection area of the arrangement-enabled area for the captured image (first projection area). The projection area fluctuates depending on a positional relationship between the AR marker and the camera of the image-capturing unit 32, and for example, the projection area for the arrangement-enabled area (first projection area) and the projection area for the arrangement-disabled area (second projection area) may overlap with each other. Thus, the display area controlling unit 37 adjusts the projection area of the space that is the arrangement target, depending on the positional relationship between the AR marker and the camera (image-capturing unit 32), and superimposes the AR content over the adjusted projection area. For example, when the arrangement-enabled area and the arrangement-disabled area overlap with each other, the arrangement-disabled area is prioritized, and the display area controlling unit 37 displays the AR content in the arrangement-enabled area from which an area is removed in which the arrangement-enabled area and the arrangement-disabled area overlap with each other. Therefore, the display area controlling unit 37 moves the AR content that has been displayed in the arrangement-enabled area before the overlapping, to a further arrangement-enabled area, and performs re-arrangement display.

For example, the display area controlling unit 37 may generate a display availability map or the like, at the time of adjustment of the projection area, and control the display area based on the generated map. The display availability map is obtained by representing, as a map, an area (space) in which the AR content is allowed to be displayed on the area (space) of the image that has been captured from the current capturing position (visual point), using the arrangement-enabled area and the arrangement-disabled area that have been defined so as to be associated with the AR marker. The display availability map is generated continuously, for example, at certain time intervals or when the capturing position is changed. In addition, the display availability map is obtained, for example, by representing the arrangement-enabled area and the arrangement-disabled area in the captured image using bit data or the like, but the embodiment is not limited to such a case.

The recognition unit 38 recognizes a reference object included in the captured image (for example, an AR marker) or the like. For example, the recognition unit 38 performs image recognition on the captured image obtained by the image-capturing unit 32, and obtains information on the AR marker, from the recognition result. In addition, the recognition unit 38 obtains the position of the AR marker for the image-capturing unit 32 (screen coordinates), and obtains identification information of the AR marker (marker ID). In the embodiment, there is a case in which an identical marker ID is obtained from a plurality of different reference objects (AR markers).

In the embodiment, for example, by providing an AR marker for an object (target object) on the actual space that is included in the captured image, as the AR content that is associated with the marker ID of the AR marker, for example, a usage method of the object, an operation procedure, a note, an inspection result, and the like may be displayed so as to be superimposed over the captured image.

The generation unit 39 generates an image that is obtained by superimposing the AR content corresponding to the marker ID of the AR marker within the projection area of the arrangement-enabled area of the captured image, based on the recognition result by the recognition unit 38. The generation unit 39 issues, for example, an obtaining request of the AR content that corresponds to the marker ID, to the server 11 or the like, and obtains the corresponding AR content. In addition, the generation unit 39 displays the obtained AR content, for example, within the projection area of the arrangement-enabled area for the captured image. When the AR content is superimposed over the captured image, the generation unit 39 may convert, for example, the coordinate of the AR content into a screen coordinate system, generate a projection image (figure) of the AR content, and superimposes the generated projection image over the captured image.

For example, there is a case in which the AR content (detailed information) is not allowed to be displayed so as to be superimposed within the projection area of the arrangement-enabled area because the size of the AR content is large, or the number of contents is large. In such a case, the generation unit 39 may generate an image that has been reduced at a certain reduction ratio (thumbnail image or the like), convert the AR content into an icon or the like that corresponds to the content type or the like that has been set in advance, generates aggregation information or the like, which is obtained by aggregating a plurality of AR contents, and superimposes the image, the icon, or the information over the projection area. In addition, when the user selects the above-described thumbnail image, icon, or the like, the display area controlling unit 37 displays the thumbnail image so as to enlarge the image, or displays the detailed AR content that corresponds to the icon so as to superimpose the detailed AR content over the projection area.

In addition, the generation unit 39 may generate a different AR content, for example, depending on whether or not marker recognition by the recognition unit 38 has been performed successfully, and superimpose the AR content over the screen. In addition, the generation unit 39 may generate a different AR content depending on time information at the time of superimposition display, and superimpose the AR content over the screen.

The calculating unit 40 calculates, for example, an area (first projection area) that is occupied by the arrangement-enabled area in the image having been captured by the image-capturing unit 32, based on coordinates that are used to specify the arrangement-enabled area, which have been associated with the arrangement-enabled area and have been accepted from the outside (for example, a user operation or the like), and a positional relationship between the camera (image-capturing unit 32) and the AR marker that is a reference of the coordinates. In addition, the calculating unit 40 calculates, for example, an area (second projection area) that is occupied by the arrangement-disabled area in the image having been captured by the image-capturing unit 32, based on coordinates that are used to specify the arrangement-disabled area, which have been associated with the arrangement-disabled area and have been accepted from the outside, and a positional relationship between the image-capturing unit 32 and the AR marker that is the reference of the coordinate. For example, the calculating unit 40 performs calculation to obtain location information that indicates the position of arrangement, from three-dimensional or two-dimensional location information, information such as the size of the AR content, and the like, for the arrangement-enabled area that has been set in the arrangement area setting unit 36. For example, the calculating unit 40 may execute processing of converting the coordinates of the arrangement area information or the coordinates of the AR content in the arrangement-enabled area, into the screen coordinate system in which the captured image is used as a reference, using a certain conversion matrix or the like.

The controlling unit 41 controls the whole pieces of processing in the configurations that are included in the terminal device 12. The controlling unit 41 executes pieces of processing such as image capturing by the image-capturing unit 32, screen display of various pieces of information through the display unit 34, and reception of input information from the user by the input unit 35. In addition, the controlling unit 41 executes pieces of processing such as setting of the arrangement area of the AR content by the arrangement area setting unit 36, control of the display area by the display area controlling unit 37, and recognition of the AR marker included in the captured image by the recognition unit 38. In addition, the controlling unit 41 executes pieces of processing such as generation of an AR content, an image to be superimposed, and the like by the generation unit 39, and certain calculation by the calculating unit 40.

<Hardware Configuration Example of Server 11>

Figure 4:
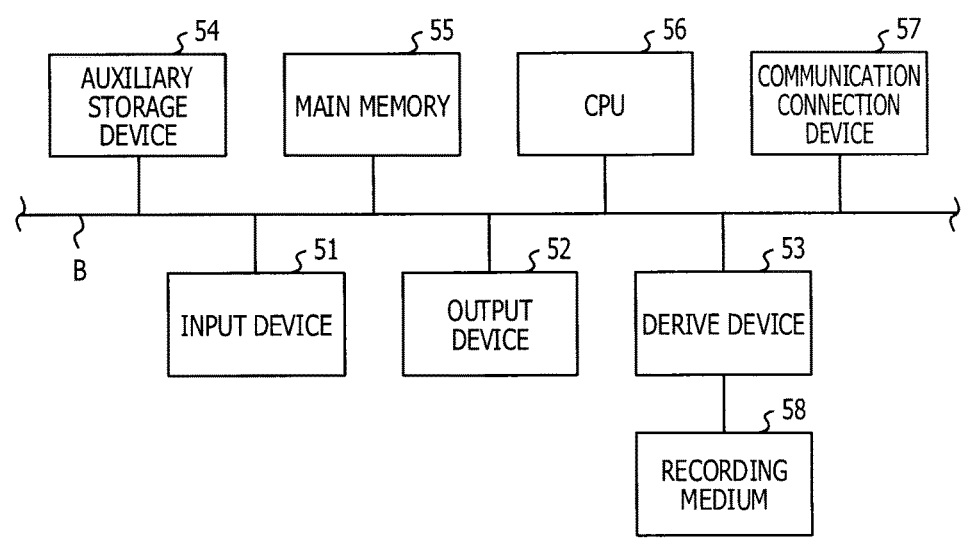
FIG. 4 is a diagram illustrating an example of a hardware configuration of the server.

A hardware configuration example of the server 11 is described below with reference to a drawing. FIG. 4 is a diagram illustrating an example of a hardware configuration of the server. In the example of FIG. 4, the server 11 includes an input device 51, an output device 52, a drive device 53, an auxiliary storage device 54, a main memory 55, a central processing unit (CPU) 56, and a network connection device 57, and the units are connected to each other through a system bus B.

The input device 51 includes pointing devices such as a keyboard and a mouse that are operated by the user or the like, and an audio input device such as a microphone, and accepts inputs such as an execution instruction of a program from the user or the like, various pieces of operation information, and information that is used to start up software or the like.

The output device 52 includes a display and the like, which displays various windows, pieces of data and the like desired to operate the computer (server 11) that executes the processing in the embodiment. The output device 52 may display execution progress, an execution result, and the like of a program by a control program included in the CPU 56.

Here, in the embodiment, for example, an execution program installed into the computer is provided by a recording medium 58 or the like. The recording medium 58 may be mounted on the drive device 53. The execution program that is stored in the recording medium 58 is installed into the auxiliary storage device 54 from the recording medium 58 through the drive device 53, based on the control signal from the CPU 56.

The auxiliary storage device 54 is, for example, a storage unit or the like such as a hard disk drive (HDD) or a solid state drive (SSD). The auxiliary storage device 54 stores the execution program in the embodiment (display control program), a control program that is installed into the computer, and the like, based on the control signal from the CPU 56, and performs input/output as appropriate. The auxiliary storage device 54 may read and write desired information from and to each piece of stored information, based on the control signal and the like from the CPU 56.

The main memory 55 stores the execution program and the like that have been read from the auxiliary storage device 54 through the CPU 56. The main memory 55 is, a read only memory (ROM), a random access memory (RAM), or the like.

The CPU 56 controls pieces of processing of the entire computer such as various pieces of calculation, and input/output of data to/from each of the hardware configuration units to achieve each of the pieces of processing, based on a control program such as an operating system (OS), and an execution program that is stored in the main memory 55. Various pieces of information and the like that are desired for execution of programs may be obtained from the auxiliary storage device 54, and the execution result and the like may also be stored in the auxiliary storage device 54.

The CPU 56 executes pieces of processing that corresponds to the programs on the main memory 55, for example, by executing the programs that have been installed into the auxiliary storage device 54, based on an execution instruction or the like of the programs, which is obtained from the input device 51. For example, the CPU 56 executes pieces of processing such as registration of arrangement area information and an AR content by an AR marker by the above-described registration unit 23, extraction of various pieces of information by the extraction unit 24, and display control so as to execute the display control program by the controlling unit 25. The processing content in the CPU 56 is not limited to the above-described content. The content that has been executed by the CPU 56 is stored in the auxiliary storage device 54 or the like as appropriate.

The network connection device 57 performs communication with the terminal device 12 or a further external device through the above-described communication network 13. The network connection device 57 obtains an execution program, software, setting information, and the like, from an external device or the like, through the connection with the communication network 13 or the like, based on the control signal from the CPU 56. In addition, the network connection device 57 may provide an execution result that has been obtained by executing the programs, for the terminal device 12 or the like, or provide the execution program in the embodiment, for an external device or the like.

The recording medium 58 is a computer readable recording medium in which the execution program and the like are stored as described above. The recording medium 58 is, for example, a semiconductor memory such as a flash memory or the like, or a portable recording medium such as a CD-ROM or a DVD, but the embodiment is not limited to such a case.

When the execution program (for example, the display control program or the like) is installed into the hardware configuration illustrated in FIG. 4, the display control processing and the like in the embodiment may be achieved by cooperation between a hardware resource and software.

<Hardware Configuration Example of Terminal Device 12>

Figure 5:
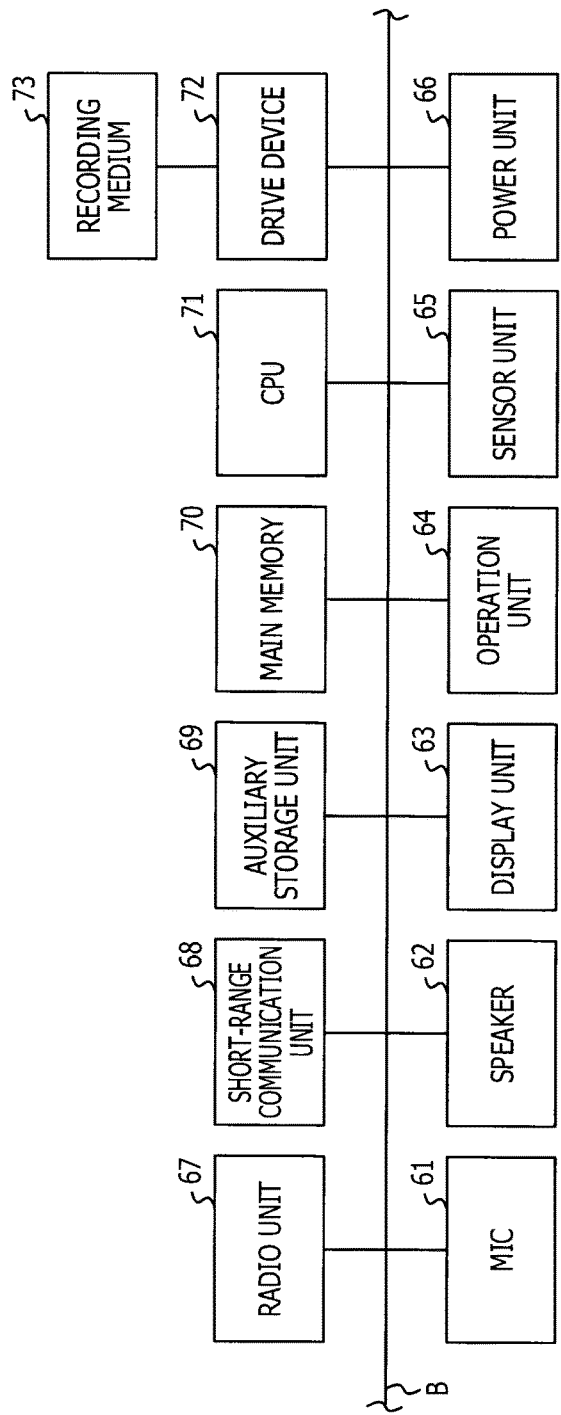
FIG. 5 is a diagram illustrating an example of a hardware configuration of the terminal device.

A hardware configuration example of the terminal device 12 is described below with reference to a drawing. FIG. 5 is a diagram illustrating an example of a hardware configuration of the terminal device 12. In the example of FIG. 5, the terminal device 12 includes a microphone (hereinafter referred to as "mic") 61, a speaker 62, a display unit 63, an operation unit 64, a sensor unit 65, a power unit 66, a radio unit 67, a short-range communication unit 68, an auxiliary storage device 69, a main memory 70, a CPU 71, and a drive device 72, and these units are connected to each other through a system bus B.

Through the mic 61, input of sound that has been uttered by the user and further sound is performed. The speaker 62 performs output of sound of an opposite calling party, and output of sound of ringtone and the like. The mic 61 and the speaker 62 may be used, for example, when conversation with an opposite calling party is performed using a call function or the like, but the embodiment is not limited to such a case, and the mic 61 and the speaker 62 may be used for input/output of information through sound.

The display unit 63 displays a screen that has been set by an OS and various applications, for the user. In addition, the display unit 63 may be a touch-panel display or the like, and in that case, the display unit 63 includes a function as an input/output unit.

The display unit 63 is, for example, a display such as a liquid crystal display (LCD), an organic electro luminescence (EL), or the like.

The operation unit 64 is an operation button displayed on the screen of the display unit 63, an operation button provided outside the terminal device 12, or the like. The operation button may be, for example, a power button or a volume adjustment button, and may be an operation key or the like that is used to input characters that are arrayed in certain order.

A touch position on the screen is detected by the display unit 63, for example, when the user performs a certain operation on the screen of the display unit 63, or presses the above-described operation button. In addition, the display unit 63 may display an application execution result, a content, an icon, a cursor, and the like, on the screen.

The sensor unit 65 detects an operation at a certain point or a continuous operation of the terminal device 12. For example, the sensor unit 65 detects the tilt angle, acceleration, direction, position, and the like of the terminal device 12, but the embodiment is not limited to such a case. As the sensor unit 65, for example, there are a tilt sensor, an acceleration sensor, a gyro sensor, a global positioning system (GPS), and the like, but the embodiment is not limited to such a case.

The power unit 66 supplies electric power to each of the configurations of the terminal device 12. The power unit 66 is, for example, an internal power source such as a battery, but the embodiment is not limited to such a case. The power unit 66 may detect an electric power amount at all times or at certain time intervals, and monitor a remaining amount or the like of the electric power amount.

The radio unit 67 is a transceiver unit of communication data, which receives, for example, a radio signal (communication data) from a base station using an antenna or the like, and transmits a radio signal to the base station using the antenna. Due to the radio unit 67, transmission and reception of data with the server 11 may be performed by the communication network 13 through the base station.

The short-range communication unit 68 may perform short-range communication with a computer such as a further terminal device 12, for example, using a communication method such as infrared communication, Wi-Fi (registered trademark), or Bluetooth (registered trademark). The above-described radio unit 67 and short-range communication unit 68 are communication interfaces by which transmission and reception of data with a further computer may be performed.

The auxiliary storage device 69 is, for example, a storage unit such as a HDD or an SSD. The auxiliary storage device 69 stores various programs and the like, and performs input/output of data as appropriate.

The main memory 70 stores an execution program and the like that have been read from the auxiliary storage device 69 by an instruction from the CPU 71, and stores various pieces of information and the like that are obtained when the program is being executed. The main memory 70 is, for example, is a ROM, a RAM, or the like, but the embodiment is not limited to such a case.

The CPU 71 achieves pieces of processing in display control by controlling pieces of processing of the entire computer such as various pieces of calculation, and input/output of data to/from each of the hardware configuration units, based on the control program such the OS, and the execution program stored in the main memory 70.

The CPU 71 executes processing that corresponds to the program installed in the auxiliary storage device 69 on the main memory 70, for example, by executing the program, based on an execution instruction or the like of the program, which is obtained from the operation unit 64 or the like. For example, the CPU 71 executes pieces of processing such as image capturing by the above-described image-capturing unit 32, screen display of various pieces of information through the display unit 34, and reception of input information from the user by the input unit 35, by executing the display control program. In addition, the CPU 71 executes pieces of processing such as setting of the arrangement area of the AR content by the arrangement area setting unit 36, control of the display area by the display area controlling unit 37, and recognition of the AR marker that is included in the captured image by the recognition unit 38. In addition, the CPU 71 executes pieces of processing such as generation of an AR content and an image that is to be superimposed, by the generation unit 39, and certain calculation by the calculating unit 40. The processing content in the CPU 71 is not limited to the above-described contents. The content having been executed by the CPU 71 is stored in the auxiliary storage device 69 or the like as appropriate.

On the drive device 72, for example, a recording medium 73 or the like may be mounted detachably, and various pieces of information that have been recorded to the mounted recording medium 73 may be read, and certain information may be written into the recording medium 73. The drive device 72 is, for example, a medium loading slot or the like, but the embodiment is not limited to such a case.

The recording medium 73 is a computer readable recording medium that stores the execution program and the like as described above. The recording medium 73 may be, for example, a semiconductor memory such as a flash memory. In addition, the recording medium 73 may be a portable recording medium such as a USB memory, but the embodiment is not limited to such a case.

In the embodiment, by installing the execution program (for example, the display control program or the like) into the above-described hardware configuration of the computer, the display control processing or the like in the embodiment may be achieved by cooperation between a hardware resource and software.

In addition, the display control program that corresponds to the above-described display control processing may be, for example, in a state of being residing on the device and may be started up by a start-up instruction.

<AR Marker Example>

An AR marker as an example of the reference object in the embodiment is described below with reference to diagrams. FIGS. 6A and 6B are diagrams illustrating examples in which an AR marker is provided on an actual object. For example, in the example of FIG. 6A, as an example of the actual object in the real space (for example, an inspection target object or the like), a pipe (piping) 80 is provided. The pipe 80 includes a plurality of valves 81-1 to 81-5. In the embodiment, for example, an AR marker 90 is provided at a position at which the AR marker 90 is allowed to be captured with the above-described pipe 80.

In the embodiment, the AR marker 90 is captured with the pipe 80 by the image-capturing unit 32 of the terminal device 12, and the recognition unit 38 reads identification information (marker ID) of the AR marker 90 by image recognition. In addition, the arrangement area setting unit 36 sets the projected arrangement area information and the like for the space of the captured image (arrangement target information, arrangement-disabled information). In the captured image, an area in which the pipe 80 or the like is displayed is set (defined) as the arrangement-disabled area in order to suppress that the area is covered by the display of the AR content. In addition, an area other than the pipe 80 is set as the arrangement-enabled area. Even on the pipe 80, an arrangement-enabled area may be set as long as the area in which the pipe 80 is displayed is not the focus target of the user.

In addition, after the setting of the arrangement area information (here, the setting may be omitted when the setting has been already performed), an AR content that corresponds to a marker ID of the AR marker 90 is set for the set arrangement-enabled area.

In addition, when the AR marker 90 is recognized from the image having been captured at the time of inspection operation or the like, the AR content that has been set so as to correspond to the marker ID of the AR marker 90 is displayed so as to be superimposed over the projection area of the arrangement-enabled area for the captured image, so that the user (operator or the like) may perform control of the pipe 80, for example, by manipulating the valves 81-1 to 81-5, based on the AR content information that has been displayed on the screen of the terminal device 12. In addition, a plurality of users may share the AR content information.

In addition, the AR content information that is obtained from the AR marker 90 is not limited to the above-described operation content, and for example, in a case in which there is a breakage such as crack in the pipe 80, a case in which repairing is desired, or the like, the AR content information may be information that is used to notify the information, a note, and the like of the user or the like.

One or more AR markers 90 may be provided for a single target object (for example, the pipe 80), and a single AR marker 90 may be provided for a plurality of target objects. In addition, when a plurality of AR markers exists in the image, determination is performed for these AR markers using a common determination condition, and an AR content may be displayed depending on the determination result.

In addition, as illustrated in FIG. 6B, for example, various pieces of information (detailed information) such as the operation content and maintenance information (operation schedule and contact information at the time of occurrence of a failure) of a device (target object) such as a server rack 82 that accommodates a computer such as a server may be obtained by capturing an image of the AR marker 90 that has been provided at a position at which the AR marker 90 is allowed to be captured with the server rack, and may be obtained by performing the image recognition on the image.

As the example of the AR marker 90, for example, a two-dimensional code such as a barcode and a QR code (registered trademark) may be applied, and a multidimensional code using a color or the like may be applied, but the embodiment is not limited to such an example, and the further reference object may also be applied. A target object on which an AR content is display by the AR marker 90 is not limited to the above-described case.

<Example of Display Control Processing in Terminal Device 12>

An example of the display control processing in the above-described terminal device 12 is described below with reference to a flowchart. As the processing in the terminal device 12, for example, there is a case in which the user or the like such as the administrator or the operator sets the arrangement area information, the AR content, and the like so as to associate the pieces of information with the AR marker, and a case in which the AR content with which the recognized AR marker is associated is displayed. In such a case, a single terminal device 12 may be used by the administrator or the operator, and for example, a plurality of terminal devices 12 may be repeatedly assigned to users (administrators, operators) or the like to execute the processing. In the following description, processing examples in the above cases are described below separately.

<First Embodiment>

Figure 7A:
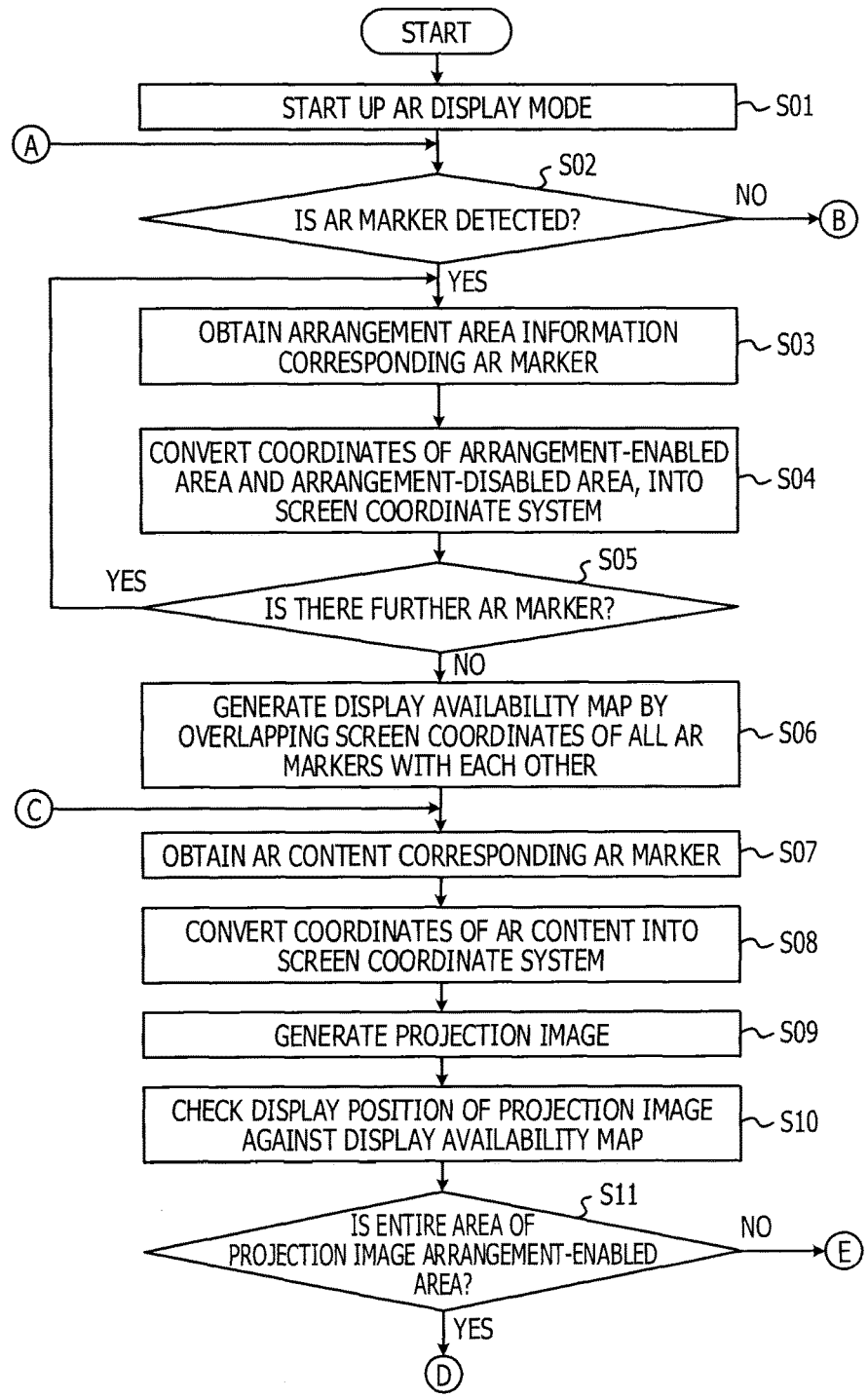
FIGS. 7A and 7B are flowcharts illustrating an example of display control processing in a first embodiment.
Figure 7B:
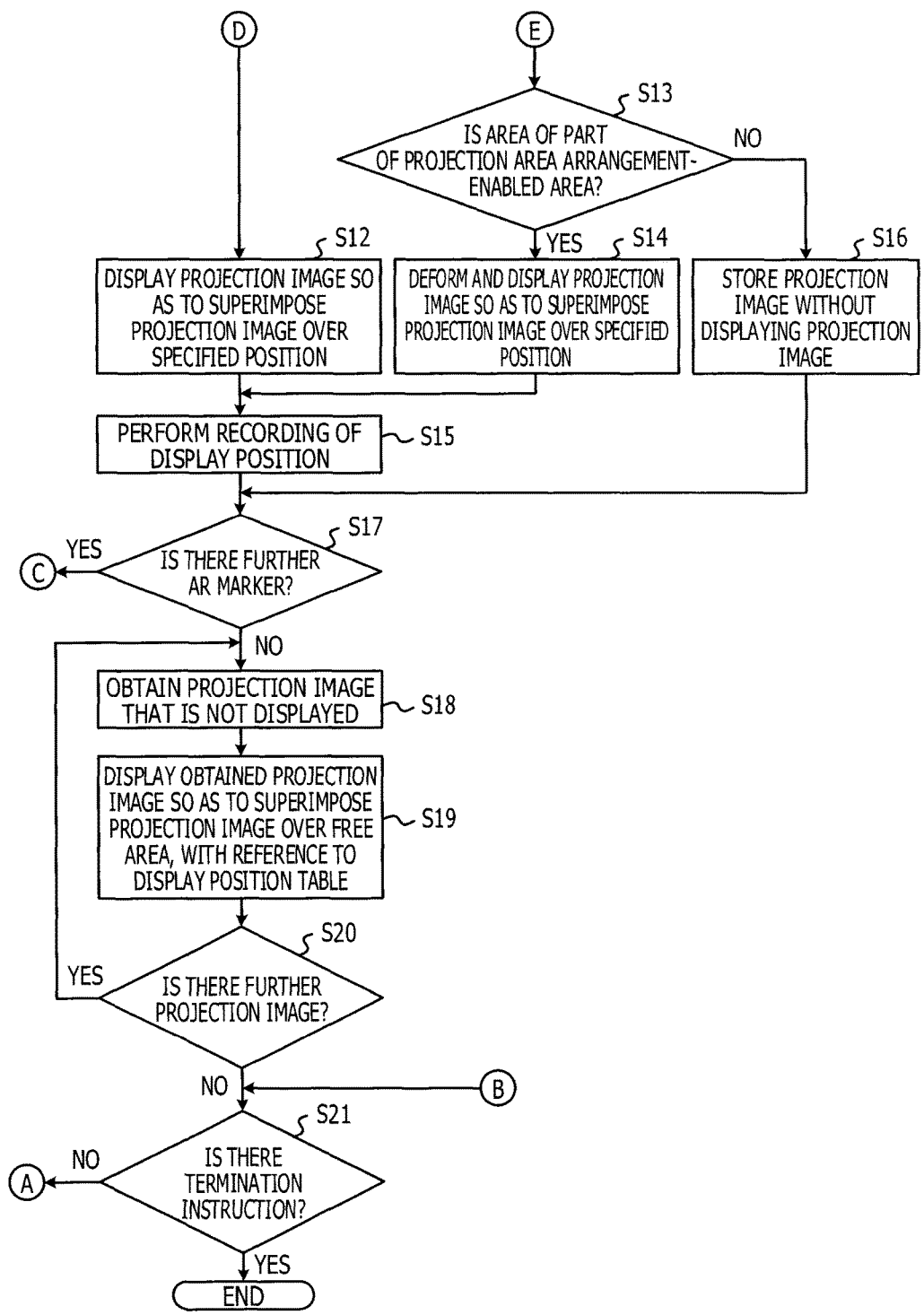

FIGS. 7A and 7B are flowcharts illustrating an example of display control processing in a first embodiment. In the example of FIGS. 7A and 7B, the terminal device 12 executes a display control program and the like in the embodiment, and starts up, for example, an AR display mode (S01). In the processing of S01, image-capturing or the like in the image-capturing unit 32 is performed, and the state transitions to the recognition state of the AR marker.

The recognition unit 38 of the terminal device 12 determines whether or not an AR marker has been detected from an image that has been captured by the image-capturing unit 32 (S02), and obtains arrangement area information that corresponds to an AR marker (for example, arrangement-enabled area, arrangement-disabled area) (S03) when the AR marker has been detected (YES in S02). In the AR content, for example, a marker ID that corresponds to the AR marker is transmitted to the server 11, and the arrangement area information that corresponds to the marker ID may be obtained from the server 11 to which the marker ID has been transmitted, but the embodiment is not limited to such a case. For example, when the terminal device 12 has already stored the arrangement area information that corresponds to the marker ID, in the storage unit 33 or the like, the terminal device 12 may use the information. In the processing of S03, as an example of the arrangement area information, the coordinates of the arrangement-enabled area and the arrangement-disabled area (for example, the relative coordinates or the like from the AR marker) are obtained.

The terminal device 12 converts the coordinates of the arrangement-enabled area and the arrangement-disabled area into a screen coordinate system that corresponds to a space having been captured by the image-capturing unit 32 (S04). In the processing of S04, projection areas of the arrangement-enabled area and the arrangement-disabled area (first projection area and second projection area) are obtained. In addition, the terminal device 12 determines whether or not there is a detected further AR marker (S05). When there is a further AR marker (YES in S05), the flow returns to the processing of S03.

In addition, when there is no further AR marker (NO in S05), the display area controlling unit 37 of the terminal device 12 overlaps screen coordinates of all of the AR markers with each other, and generates a display availability map of the AR contents in the captured image (S06). For example, in the processing of S06, for example, the display area controlling unit 37 generates a display availability map as the arrangement-disabled area when the arrangement-enabled area (superimposition-enabled area) and the arrangement-disabled area (superimposition-disabled area)

that have been set in advance overlap with each other. This is why, it is avoided that the AR content is superimposed over the area that has been defined as the arrangement-disabled area by the user. In addition, when the two arrangement-enabled areas that have been defined in advance overlap with each other, the display area controlling unit 37 sets the overlapped area as the arrangement-enabled area as is. In addition, when two arrangement-disabled areas overlap with each other, the display area controlling unit 37 sets the overlapped area as the arrangement-disabled area as is.

The terminal device 12 obtains an AR content that corresponds to the AR marker having been obtained by the processing of S02 (S07). In the processing of S07, for example, the terminal device 12 transmits the marker ID or the like that corresponds to the AR marker, to the server 11 or the like, and obtains the AR content that corresponds to the marker ID, from the server 11. In the processing of S07, the embodiment is not limited to such a case, and when an AR content corresponding to the marker ID exists in the storage unit 33 or the like in advance, the AR content may be obtained.

The terminal device 12 converts the coordinates of the AR content into the screen coordinate system (S08), and generates a projection image (figure) of the AR content (S09). After that, the terminal device 12 checks the display position of the projection image, against the above-described display availability map (S10), and determines whether or not the entire area of the projection image is the arrangement-enabled area (S11). In the processing of S11, when the entire area of the projection image is the arrangement-enabled area (YES in S11), the projection image is displayed so as to be superimposed over a specified position on the captured image (S12).

In addition, when not the entire area of the projection image is the arrangement-enabled area (NO in S11), the terminal device 12 determines whether or not a part of the projection image is the arrangement-enabled area (S13). When a part of the projection image is the arrangement-enabled area (YES in S13), the projection image is deformed, and displayed so as to be superimposed over the specified position on the captured image (S14). In the processing of S14, the deformation of the projection image is, for example, a reduction in the projection image at a certain reduction rate, but the embodiment is not limited to such a case. In addition, the certain reduction rate is, for example, a reduction rate at which all or a certain area or more of the projection image is displayed on the arrangement-enabled area by reducing the projection image, but the embodiment is not limited to such a case, and for example, the certain reduction rate may be a fixed reduction rate that has been set in advance.

In addition, in the processing of S14, as an example of deformation of the projection image, a thumbnail image corresponding to the AR content (projection image) may be generated and displayed so as to be superimposed over the specified position, and an icon or the like corresponding to the AR content (projection image) may be displayed so as to be superimposed over the specified position. The icon is stored in the storage unit 33, the server 11, or the like in advance, for example, so as to be associated with the type of the AR content, and an icon or the like corresponding to the AR content that is to be displayed may be obtained and displayed so as to be superimposed over the specified position. The actual projection image may be displayed, for example, as a pop-up screen or the like by selecting a thumbnail image or an icon that has been displayed on the screen by the user. After the processing of S12 or S14, for example, a display area (coordinate) and the like are recorded to the display position table or the like (S15).

In addition, in the processing of S13, when even a part of the area of the projection image is not the arrangement-enabled area (NO in S13), the entire projection image is arranged in the arrangement-disabled area, so that the terminal device 12 does not display the projection image in the area that has been captured from the current angle (visual point) or the like, and the projection image is stored in the storage unit 33 or the like (S16).

After the processing of S15 or S16, the terminal device 12 determines whether or not there is a further AR marker (S17), and when there is a further AR marker (YES in S17), the flow returns to the processing of S07. In addition, when there is no further AR marker (YES in S17), the projection image that is not displayed and is stored in the processing of S16 is obtained (S18), and the projection image that has been obtained in the processing of S18 is displayed on a free area of the arrangement-enabled area, with reference to the display position table (S19). In addition, the terminal device 12 determines whether or not there is a further stored projection image (S20). When there is a further stored projection image (YES in S20), the flow returns to the processing of S18.

In addition, when there is no stored further projection image in the processing of S20 (NO in S20), or when an AR marker is not detected in the processing of S02 (NO in S02), it is determined whether or not there is a termination instruction through the operation by the user or the like (S21), and when there is no termination instruction (NO in S21), the flow returns to the processing of S02. In addition, when there is a termination instruction (YES in S21), the processing ends.

<Second Embodiment>

Figure 8B:
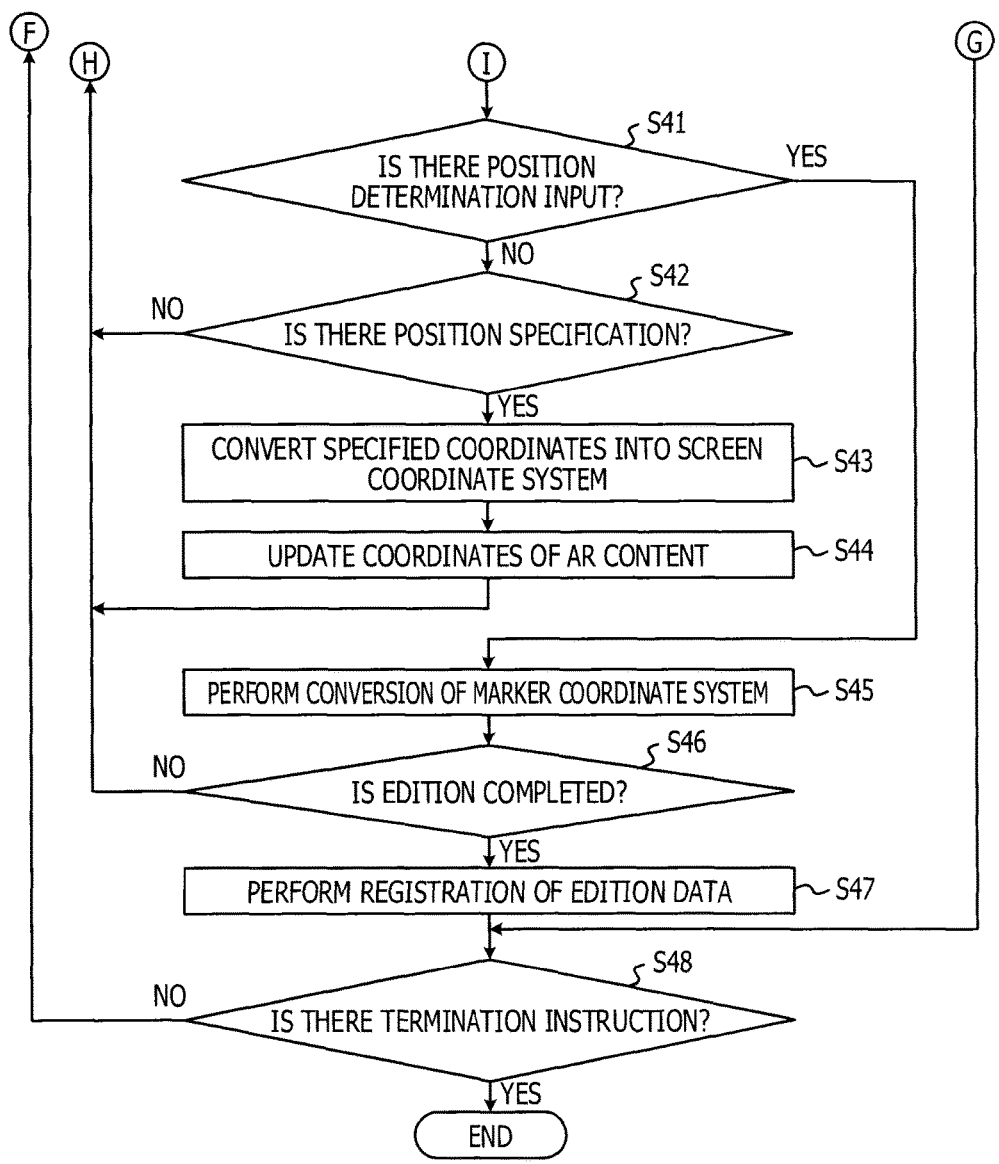

FIGS. 8A and 8B are flowcharts illustrating an example of display control processing in a second embodiment. FIGS. 8A and 8B are, for example, flowcharts when an administrator or the like as the user of the terminal device 12 sets an AR content or the like that corresponds to an arrangement area (arrangement-enabled area, arrangement-disabled area) and an AR marker.

In the example of FIGS. 8A and 8B, the terminal device 12 executes the display control program or the like in the embodiment, and for example, and starts up an AR display mode for arrangement area setting (S31). In the processing of S31, the state transitions to an AR marker recognition state while image-capturing and the like in the image-capturing unit 32 are performed.

The recognition unit 38 of the terminal device 12 determines whether or not an AR marker has been detected in the captured image (S32), and the recognition unit 38 executes marker recognition processing (S33) when the AR marker has been detected (YES in S32). In the processing of S33, for example, processing that is similar to the above-described pieces of processing of S03 to S05 in the first embodiment is executed, so that the detailed description is omitted herein.

The terminal device 12 calls edition processing for setting arrangement area information (S34), performs switching into a still image display mode (S35), and displays an image that has been captured by the image-capturing unit 32, an operation menu that has been set in advance, and the like (S36).

The terminal device 12 performs setting of arrangement area information (arrangement-enabled area, arrangement-disabled area) (S37). After that, the terminal device 12 selects an AR definition object (S37). In the processing of S37, for example, the arrangement-enabled area and the arrangement-disabled area may be set for a still image of the displayed captured image. When setting of the arrangement area information has been already performed, the processing of S37 may be omitted.

The terminal device 12 performs setting of the AR content that corresponds to the AR marker (S38). In the processing of S38, the AR content is set so as to be associated with a marker ID that corresponds to the AR marker. As the set AR content, for example, at least one of a plurality of AR contents that are stored in the storage unit 33 in advance may be selected, and at least one of a plurality of AR contents that are accumulated in the server 11 or the like may be selected by an access to an external device such as the server 11.

The terminal device 12 generates a projection image of the set AR content (S39), and superimposes and combines the projection image of the AR object with the captured image (S40). After that, the terminal device 12 determines whether or not there is a position determination input from the user or the like through an operation menu or the like (S41). When there is no position determination input (NO in S41), the terminal device 12 determines whether or not there is position specification (S42). In the processing of S42, for example, the position specification may be performed through a touch operation by the user for the display screen of the terminal device 12, and may be position specification or the like by numeric value setting of a coordinate parameter or the like, but the embodiment is not limited to such a case. It is desirable that, for example, in the position specification, the AR content is set within the arrangement-enabled area, but it is probable that the AR content is displayed within the arrangement-disabled area depending on a different capturing angle even when the AR content is set within the arrangement-enabled area, so that the embodiment is not limited to such a case.

In the processing of S42, when there is position specification (YES in S42), the terminal device 12 converts the specified coordinates into coordinates of the screen coordinate system (S43). In addition, the terminal device 12 updates the coordinates of the AR content (S44), and the flow returns to the processing of S36. In addition, in the processing of S42, when there is no position specification (NO in S42), similarly, in the terminal device 12, the flow returns to the processing of S36.

In the above-described processing of S41, when there is a position determination input (YES in the processing of S41), the coordinates of the position that has been specified for the AR content are converted into coordinates of the marker coordinate system (relative coordinate system using the position of the AR marker that is included in the captured image as a reference) (S45). After that, the terminal device 12 determines whether or not the edition has been completed (S46), and when the edition is not completed (NO in S46), the flow returns to the processing of S36. In addition, when the edition has been completed (YES in S46), registration of the edition data is performed (S47). In the processing of S47, for example, the marker ID that corresponds to the AR marker, the set arrangement area information, the set AR content, and the like may be registered to the server 11, or registered by storing the set arrangement area information, the AR content, and the like in the storage unit 33, but the embodiment is not limited to such a case.

The terminal device 12 determines whether or not a termination instruction has been received from the user or the like (S48), and when a termination instruction is not received (NO in S48), the flow returns to the processing of S32. In addition, when a termination instruction has been received (YES in S48), the processing ends.

<Specific Example of Display Control>

Figure 9A:
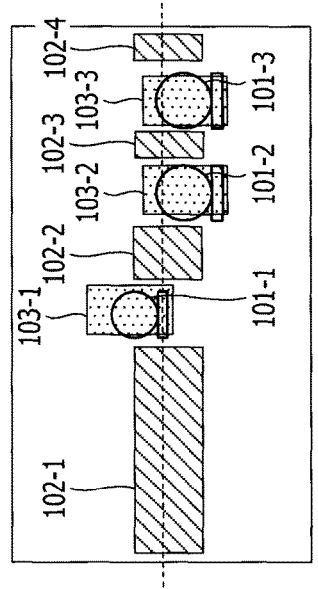
FIGS. 9A, 9B, 9C, and 9D are diagrams illustrating setting examples of arrangement area information.
Figure 9B:
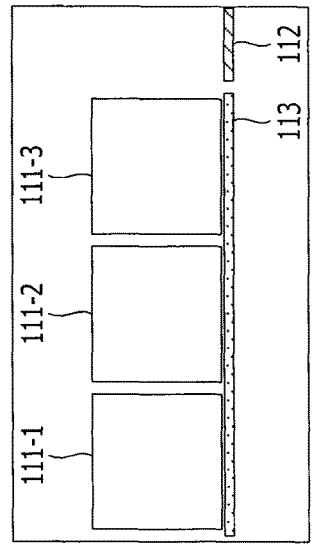
Figure 9C:
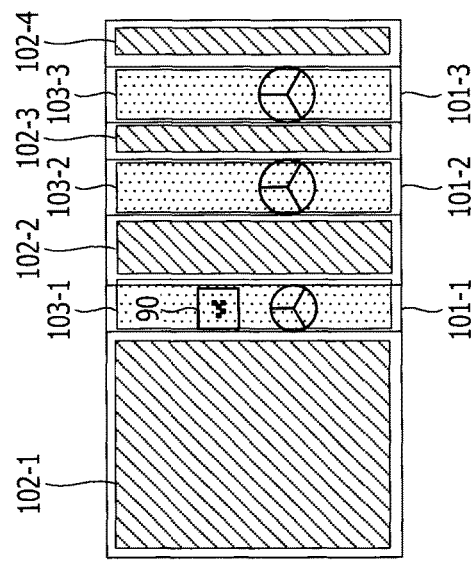
Figure 9D:
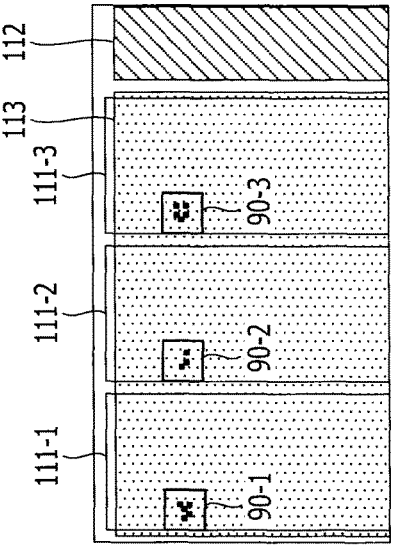

A specific example of display control in the embodiment is described below with reference to diagrams. FIGS. 9A, 9B, 9C, and 9D are diagrams illustrating setting examples of arrangement area information. FIGS. 9A and 9B illustrate setting examples of arrangement area information in a three-dimensional space, and FIGS. 9C and 9D illustrate setting examples of arrangement area information in a two-dimensional plane. In addition, FIGS. 9A and 9C illustrate examples of an image that has been captured from the front of the AR marker 90, and FIGS. 9B and 9D illustrate examples in which the spaces that have captured in FIGS. 9A and 9C are viewed from above.

In the embodiment, for example, after the AR marker has been provided in the actual space, an arrangement-enabled area and an arrangement-disabled area of the AR content are set, and the set information is registered to the server 11, the storage unit 33 of the terminal device 12, or the like. In this case, the arrangement area information may be set in the three-dimensional space as illustrated in FIGS. 9A and 9B, and may be set in the two-dimensional plane as illustrated in FIGS. 9C and 9D. The settings may be selectively used, for example, depending on the content of a target object (actual object) in which the AR content is arranged, the shape of the AR content, or the like.

For example, as illustrated in FIGS. 9A and 9B, when an actual object 101 that is a target in which the AR content is displayed is a three-dimensional object, it is desirable that the arrangement area information is set by three-dimensional information (volume), in accordance with the original. As illustrated in FIGS. 9C and 9D, when the displayed AR content may be a two-dimensional plane, the plane may be set by two-dimensional information (area) in accordance with the original.

For example, as illustrated in FIGS. 9A and 9B, for actual objects (focus target objects) 101-1 to 101-3 such as piping (pipe) in which valves are respectively provided, arrangement-enabled areas (for example, free areas such as a wall or a floor) 102-1 to 102-4 and arrangement-disabled areas 103-1 to 103-3 are set by three-dimensional coordinates. In the example of FIGS. 9A and 9B, the arrangement-disabled areas 103-1 to 103-3 are set so that the actual objects 101-1 to 101-3 are not covered.

In addition, in the example of FIGS. 9C and 9D, an arrangement-enabled area 112 and an arrangement-disabled area 113 are set for actual objects 111-1 to 111-3 such as large servers, by the two-dimensional coordinates along a plane. In the example of FIGS. 9C and 9D, the single arrangement-enabled area 112 is set for the plurality of actual objects 111-1 to 111-3 or a plurality of AR markers 90-1 to 90-3, but the embodiment is not limited to such a case, and arrangement area information may be set for each of the actual objects or for each of the AR markers. At the time of registration of the arrangement area information, the arrangement-enabled area 112 and the arrangement-disabled area 113 are set so as to be associated with each of the AR markers 90-1 to 90-3.

As the setting method of the arrangement area information (arrangement-enabled area, arrangement-disabled area), for example, the arrangement area information may be set by a touch operation of the user to the screen by authoring processing of the terminal device 12. In addition, as a further method, for example, by recognition processing of the captured image, a feature point in the image is extracted, and an area in which a feature amount is small (for example, a wall, a floor, or the like) is set as the arrangement-enabled area. In addition, as a further method, information that indicates the arrangement area (for example, a coordinate value or the like) is managed by text data in advance, and for example, in a situation or the like in which it is difficult for the user to perform the operation, the setting or the like of the arrangement area information is performed by obtaining the text data from the storage unit 33, the server 11, or the like. In the arrangement area information (arrangement-enabled area, arrangement-disabled area), for example, the relative position coordinates of vertexes (4 points in a case of a rectangle) using the position of the marker ID as a reference are registered so as to correspond to the marker ID. In addition, when there is a plurality of arrangement-enabled areas, registration of the coordinates that indicates the area is performed for each of the areas.

Here, the arrangement area information is assumed, for example, as follows.

Marker ID: 100,

<Arrangement-enabled area> an area ID1: (x, y, z)= {(−50, 30, 0), (−50, −10, 0), (−5, 30, 0), (−5, −100, 0)}, an area ID2: {omission}, <Arrangement-disabled area> an area ID1: (x, y, z)= {(−20, 30, 0), (−20, −10, 0), (10, 30, 0), (10, −100, 0)}, an area ID2: {omission}, and the like.

However, the embodiment is not limited to such a case. In addition, an AR content, display position of the AR content, and the like are registered so as to be associated with the marker ID.

Figure 10A:
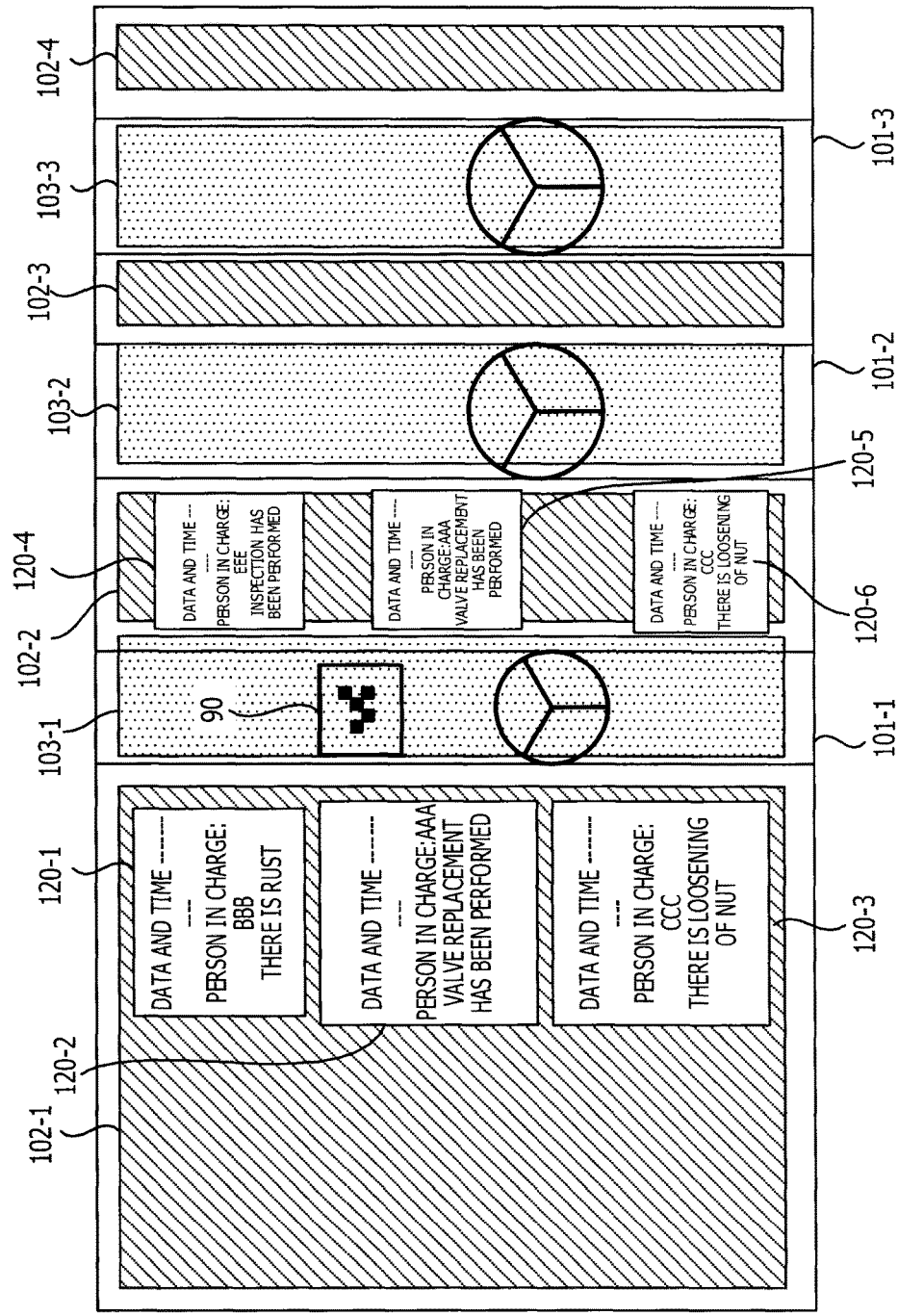

FIGS. 10A to 10D illustrate display examples of an AR content. FIGS. 10A to 10D illustrate a diagram that corresponds to FIG. 9A. In addition, FIG. 10A illustrates an example of an image that has been captured from a visual point A in a diagram illustrated in FIG. 10B, which is viewed from above, and FIG. 10C illustrates an example of an image that has been captured from a visual point B in a diagram illustrated in FIG. 10D, which is viewed from above. In the example of FIGS. 10A to 10D, for convenience of description, arrangement-enabled areas 102 and arrangement-disabled areas 103 are displayed.

In the example of FIG. 10, the terminal device 12 access the server 11 using the marker ID that corresponds to the detected AR marker 90, obtains pieces of information on an AR content and an arrangement area that corresponds to the marker ID, from the server 11, and performs image display of the arrangement-enabled area.

For example, in the embodiment, when a visual point (angle) from which image-capturing is performed is different as illustrated in FIGS. 10B and 10D, and AR contents 120-1 to 120-6 are displayed at certain positions of the arrangement-enabled area 102 that has been arranged as illustrated in FIGS. 10A and 10C. In the embodiment, the AR contents 120-1 to 120-6 are arranged on the actual objects 101 such as the piping that are focus objects of the user, and the AR contents 120 are displayed so as not to be superimposed over the arrangement-disabled areas 103 in order to suppress that the visibility of the user is hindered. Each of the AR contents 120-1 to 120-6 illustrated in FIGS. 10A and 10C is a content of text information that includes "creation date and time", "person in charge", "comment", and the like, as an example, but the embodiment is not limited to such a case, and for example, each of the AR contents 120-1 to 120-6 may be a sign, a mark, an image, a movie, a pictogram, a stamp, or the like.

In addition, in the embodiment, as illustrated in the AR contents 120-4 to 120-6 of FIG. 10A, the AR contents may be displayed so as to be associated with the size of the arrangement-enabled area 102-2. In addition, when image-capturing is performed from the visual point B illustrated in FIG. 10D, there is a case in which the arrangement-enabled area 102-2 and the arrangement-disabled area 103-1 overlap with each other as illustrated in FIG. 10C. In such a case, the arrangement-disabled area 103-1 is prioritized, and the AR content is displayed in an arrangement-enabled area that is obtained by removing the area in which the arrangement-enabled area 102-2 and the arrangement-disabled area 103-1 overlap with each other. Therefore, the AR contents 120-4 to 120-6 that have been displayed on the arrangement-enabled area 102-2 are moved to a further arrangement-enabled area (for example, the arrangement-enabled area 102-1) and are displayed (re-arrangement display). In the example of FIG. 10C, the display position of the AR contents 120-1 to 120-3 that have been already displayed on the arrangement-enabled area 102-1 are readjusted in addition to the AR contents 120-4 to 120-6, and the AR contents are displayed so as to be superimposed over the captured image.

As described above, the superimposition positions of the AR contents 120-1 to 120-6 are changed (re-arranged) depending on a change in an capturing angle (visual point), so that the superimposition positions are shifted from the display positions (coordinates) that have been actually specified by the user. Therefore, in the embodiment, for example, as illustrated in FIG. 10C, arrows or the like are displayed so as to be destined from the AR contents 120-1 to 120-6 to the display positions that have been specified by the user. As a result, the user may grasp the positions (spaces) in which the displayed AR contents have been located, appropriately and immediately.

By the above-described display control of the AR contents, even when an angle (visual point) at which an area (space) that includes the AR marker 90 is captured is changed, the AR contents may be arranged dispersedly so as not to be overlapped with a target object such as an actual object on which the user focuses attention.

<Specific Example of Display Availability Map>

A specific example of the above-described display availability map is described below. FIG. 11 is a diagram illustrating the specific example of the display availability map. The example of FIG. 11 corresponds to the above-described diagram of FIG. 9A. In the embodiment, as illustrated in FIG. 11, a display availability map that is generated from a projection area obtained by converting pieces of location information of the arrangement-enabled areas 102-1 to 102-4, the arrangement-disabled areas 103-1 to 103-3 in the marker coordinate system of the AR marker 90 that is recognized at the present time, for example, into a screen coordinate system (X, Y) using the top left of the image as a reference.

For example, the display availability map illustrated in FIG. 11 holds the projection areas of the arrangement-enabled area and the arrangement-disabled area as bit map data of a screen resolution portion. In the data format of the display availability map, the projection area is held as mask bits. In this case, as illustrated in the example of FIG. 11, a bit pattern is set in which "1" is the arrangement-enabled area ("display is enabled"), and "0" is the arrangement-disabled area ("display is disabled"), but the embodiment is not limited to such a case, and for example, "1" and "0" may be inversely-assigned. In addition, in the embodiment, an area other than the arrangement-enabled area and the arrangement-disabled area may be included. In that case, for example, a bit pattern may be set in which the arrangement-enabled area or the arrangement-disabled area is "1", and the other areas are "1". In addition, in the example of FIG. 11, the bit pattern of the display availability map is schematically illustrated, but for example, a bit pattern may be set for each pixel.

In addition, in the embodiment, for example, when in a plurality of AR markers (for example, the AR markers 90-1 and 90-2) is detected in the captured image, the above-described display availability map is generated for each of the detected AR markers, the respective generated display availability maps are combined with each other to generate a display availability map that correspond to the plurality of AR markers.

FIGS. 12A, 12B, 12C, and 12D are generation diagrams of the integrated display availability map. For example, in the example of FIG. 12A, when the actual objects 101-1 to 101-3 exist in the captured image, arrangement-enabled areas 121-1 and 121-2 and an arrangement-disabled area 122-1 are set for the AR marker 90-1. In addition, in the example of FIG. 12B, arrangement-enabled areas 121-3 and 121-4 and an arrangement-disabled area 122-2 are set for the AR marker 90-2 that is included in the captured image that is the same as FIG. 12A.

In this case, the last display availability map for the captured image corresponds to an area as illustrated in FIG. 12C that is obtained by combining the areas in FIGS. 12A and 12B with each other. In the integration of the areas, when the arrangement-enabled area and the arrangement-disabled area overlap with each other, the arrangement-disabled area is prioritized. In addition, when a plurality of arrangement-enabled areas overlaps with each other, the overlapped area is set as the arrangement-enabled area. In addition, when a plurality of arrangement-disabled areas overlaps with each other, the overlapped area is set as the arrangement-disabled area.

As a result, in the example of FIG. 12C, arrangement-enabled areas 121-5 to 121-7 and the arrangement-disabled areas 122-1 and 122-2 are set by integrating the setting results of FIGS. 12A and 12B. In addition, a display availability map as illustrated in FIG. 12D is generated from such results. In the generation of the above-described display availability map, the processing is executed at certain time intervals repeatedly during the image-capturing, and for example, depending on a different capturing angle (visual point) or the like of the AR marker, a display availability map is generated based on projection areas of the arrangement-enabled area and the arrangement-disabled area that correspond to the image that has been captured from the position.

<Generation Example of Display Position Table>

Figure 13A:
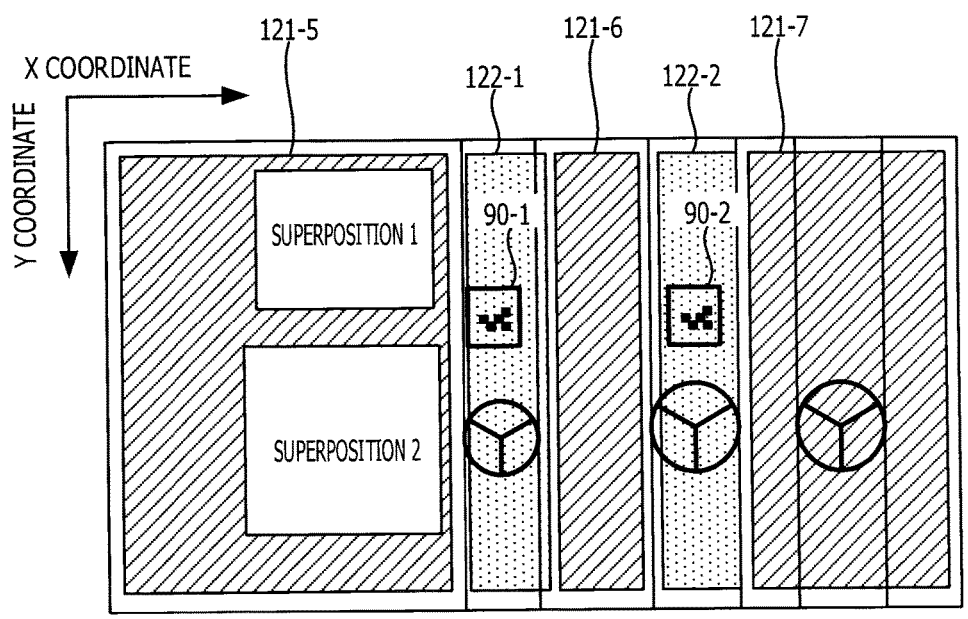
FIGS. 13A, 13B, and 13C are diagrams illustrating generation examples of a display position table.
Figure 13B:
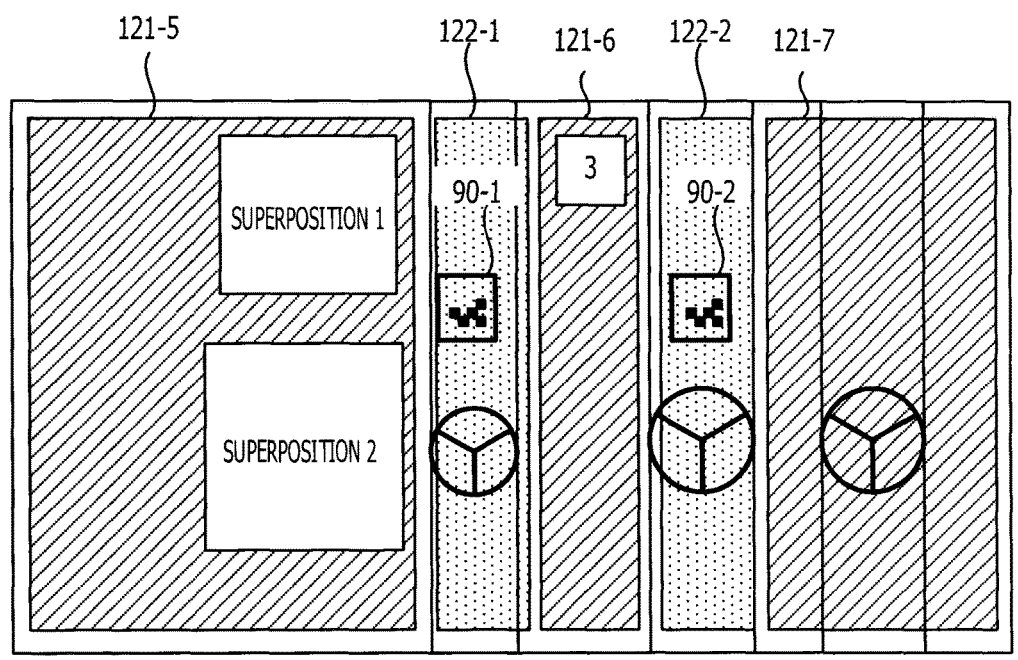
Figure 13C:
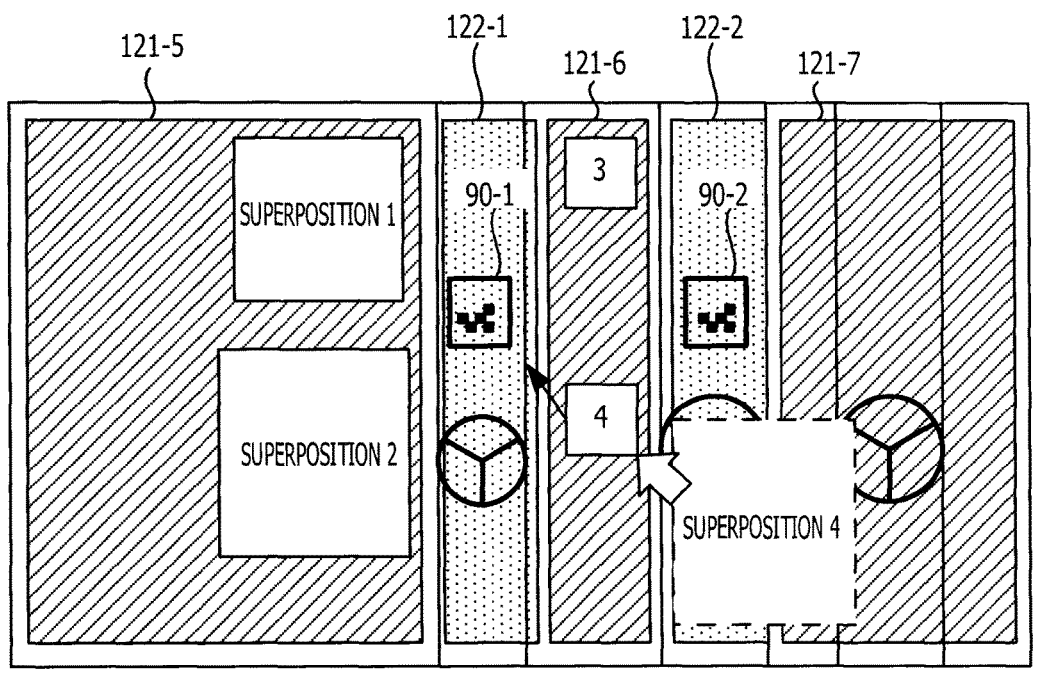

A generation example of the above-described display position table is described below with reference to drawings. FIGS. 13A to 13C are diagrams illustrating generation examples of the display position table. In each of FIGS. 13A to 13C, a display position table that is associated with the display states of the AR contents that are superimposed over the captured image illustrated on the left side is illustrated on the right side. In the captured image of FIGS. 13A to 13C, the arrangement-enabled areas 121-5 to 121-7 and the arrangement-disabled areas 122-1 and 122-2 for the AR markers 90-1 and 90-2 are set.

As the items of the display position table, for example, there are "AR content", "marker ID", "display area", and the like, but the embodiment is not limited to such a case. Here, "AR content" is identification information of an AR content that has been displayed so as to be associated with a marker ID of an AR marker. In addition, "marker ID" is identification information of a marker, which is obtained from the AR marker. In addition, "display area" is information that indicates the display area of the AR content. In the examples of FIGS. 13A to 13C, the display area is represented, for example, by the coordinates of vertexes of the rectangular region of the AR content, but the embodiment is not limited to such a case. In addition, in the display area, display position information of the AR content using a two-dimensional screen coordinate system (X, Y) for the captured image is indicated, but the embodiment is not limited to such a case, and for example, a three-dimensional coordinate system or the like may be used.

For example, each of the AR contents that are set so as to be associated with the marker IDs of the AR markers is checked against the above-described display availability map, and is arranged in the arrangement-enabled ("display-enabled") areas that are included in the captured image, in order.

For example, as illustrated in FIG. 13A, all of the superimposition areas of the projection images (figures) of the AR contents (for example, superimposition 1, superimposition 2) exist in the arrangement-enabled area 121-5, and the AR contents do not overlap with each other. Thus, all of the AR contents are displayed as is. In addition, for the display area or the like of the AR content, the coordinates or the like based on the screen coordinate system or the like are stored in the display position table. For example, for the AR content (superimposition 1), {Top Left: (50, 5), Bottom Left: (50, 50), Top Right: (100, 5), Bottom Right (100, 50)} is stored.

In addition, in a case in which an AR content (for example, superimposition 3) is displayed on an arrangement-enabled area 121-6 as illustrated in FIG. 13B in addition to the display contents of FIG. 13A, when a part of the projection image of the superimposition 3 is within the arrangement-enabled area, the AR content (projection image) is displayed by reducing the size. For example, when a certain threshold value (for example, about 80%) or more of the entire display area of the projection image is within the arrangement-enabled area, it is regarded as the part of the projection image is within the arrangement-enabled area, but the embodiment is not limited to such a case. In addition, the character size of text information that is displayed in the projection image may be reduced so as to correspond to the above-described reduction rate of the projection image of the area.

In addition, in the example of FIG. 13B, as an example in which the area of the projection image is reduced, a thumbnail image, a certain icon, and the like that indicate there is the AR content (superimposition 3) may be displayed. The display area or the like in the superimposition 3 is stored in the display position table with the AR content, the marker ID, and the like.

Here, for example, when an AR content (for example, superimposition 4) is displayed on the screen, the display position (area) of the superimposition 4, which is specified in advance includes an arrangement-disabled ("display-disabled") area (arrangement-disabled area 122-2) due to the influence of the capturing angle or the like. Therefore, the AR content (superimposition 4) is not allowed to be displayed at the specified position as is. In such a case, the display position table, the display availability map, and the like are searched for an area (free area) over which the AR content is not superimposed, from among the arrangement-enabled areas after the AR content (superimposition 4) has been stored in the storage unit 33, and the display of the other AR contents (superimpositions 1 to 3) have been completed. In addition, when there is a free area, the AR content (superimposition 4) is displayed using the area.

For example, in FIG. 13C, the AR content is displayed using the free area of the arrangement-enabled area 121-6. In addition, in FIG. 13C, the reduced AR content (superimposition 4) is displayed. The display area or the like that has been changed in the AR content (superimposition 4), the display area that has been changed is stored in the display position table with the AR content, the marker ID, and the like.

For the display area of the display position table illustrated in FIGS. 13A to 13C, the vertex coordinates of the rectangular region in the two-dimensional space are set, but the embodiment is not limited to such a case, and for example, three-dimensional coordinates may be employed, and a circle area or a sphere area using a certain radius in which the center coordinates of the AR content is used as a reference may be employed.

<Screen Display Example>

Screen display examples of AR contents are described below with reference to diagrams. FIGS. 14 to 16 are diagrams (first to third diagrams) illustrating screen display examples of AR contents. In each of the display examples of FIGS. 14 to 16, for example, a display content is generated by the generation unit 39, and the display control is performed by the display area controlling unit 37. In addition, a captured image, an arrangement-enabled area, and an arrangement-disabled area illustrated in FIGS. 14 to 16 correspond to those of FIG. 9A. In addition, as illustrated in the examples of FIGS. 14 to 16, in the embodiment, in the display of the AR content (text information, image, or the like), the display control is performed so that it is suppressed that visual recognition of further information is hindered by the display of the AR content.

As the generation of a display content in the generation unit 39, for example, there are generation of a thumbnail image of an AR content, conversion into an icon, change in a font (character size), generation of message aggregation (aggregation information), and the like. In addition, as the display control by the display area controlling unit 37, for example, there are output of the merely latest information, priority display based on the user authority level, enlargement display due to selection by the user from a thumbnail image, an icon, and the like. In addition, as an example of the display control, there are display of a usage history, AR content display that corresponds to a time period, and the like, but the embodiment is not limited to such a case.

Figure 14A:
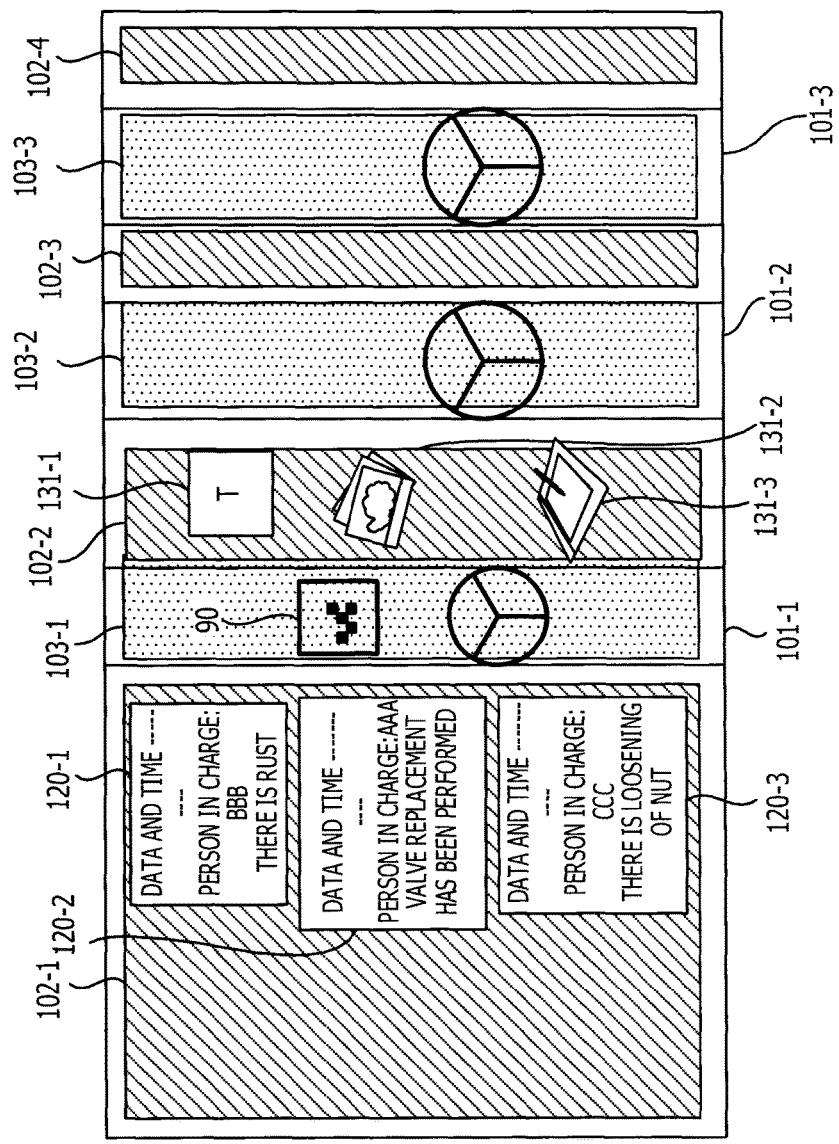
FIGS. 14A, 14B, and 14C are diagrams (first diagrams) illustrating a screen display example.
Figure 14B:
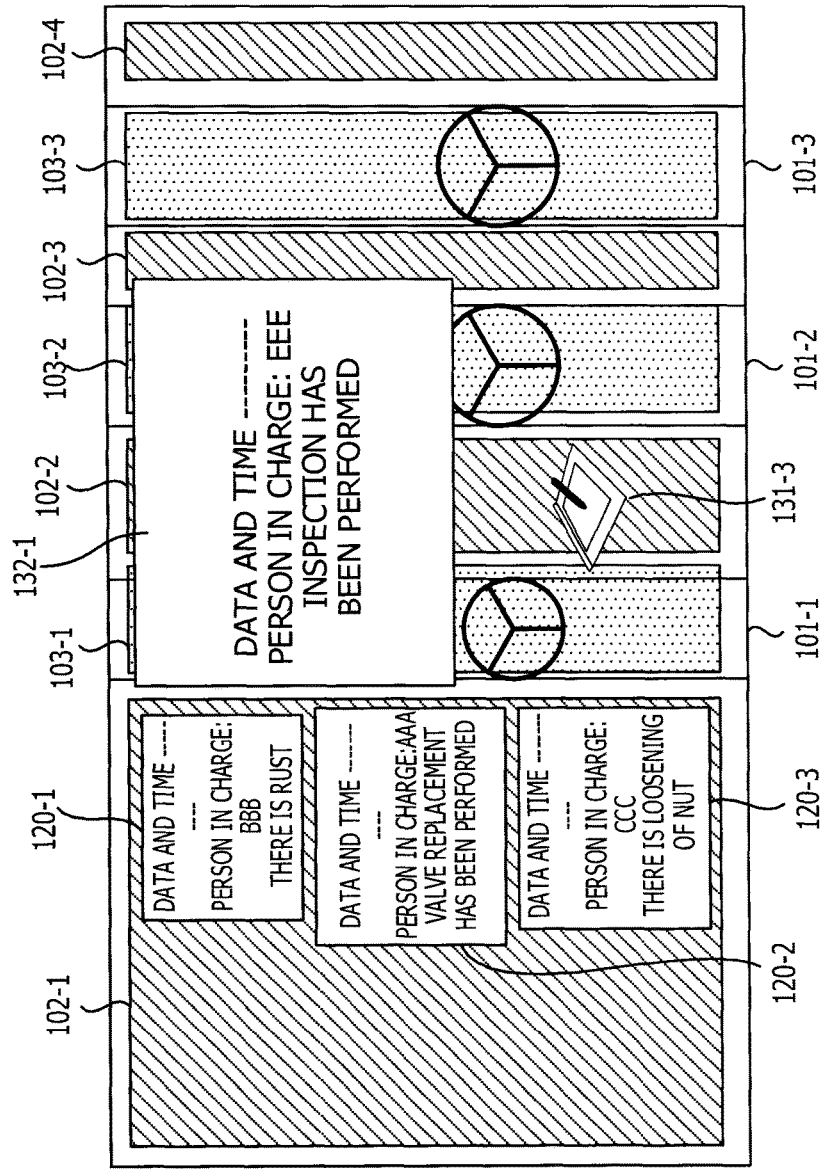
Figure 14C:
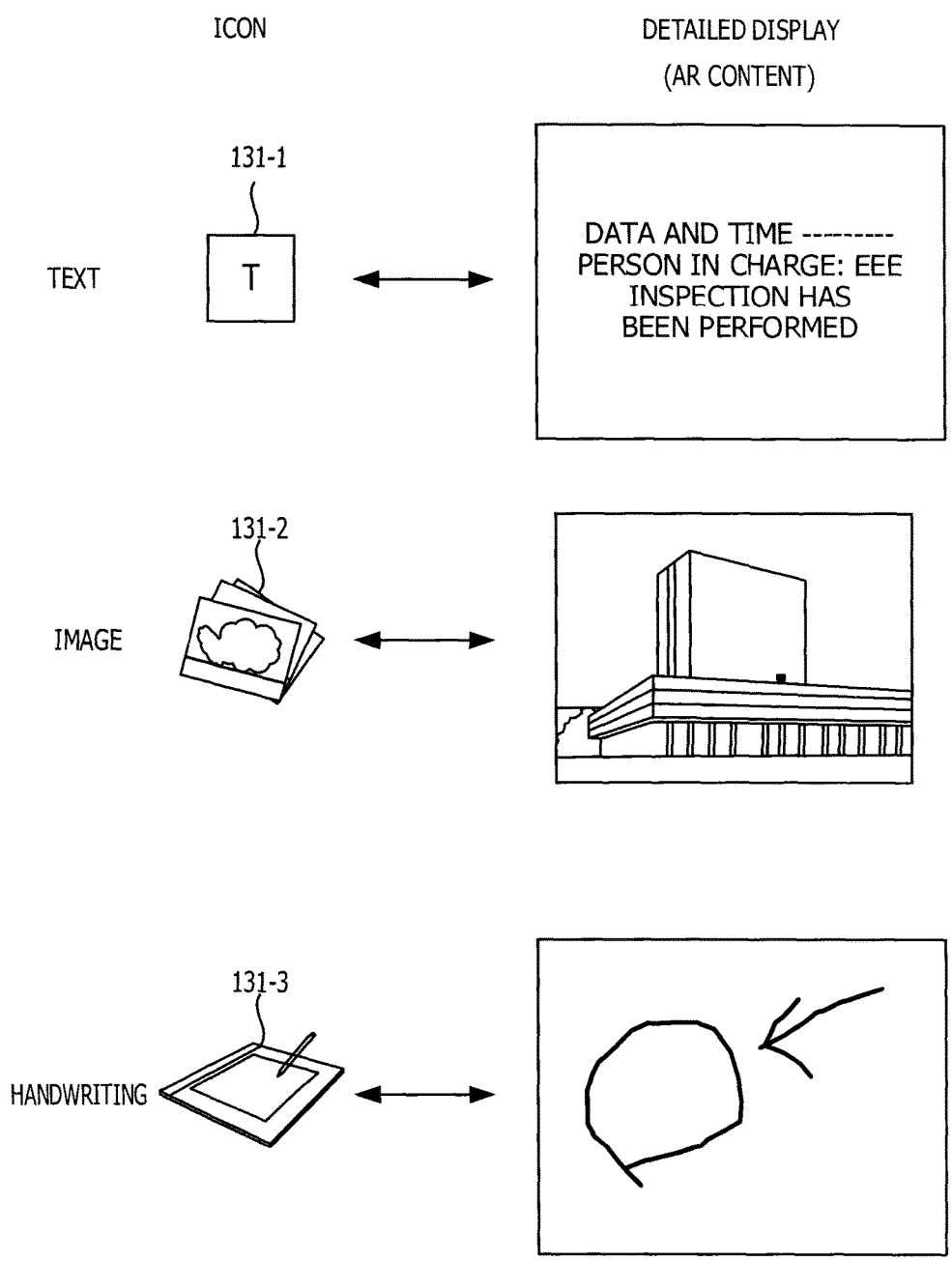

For example, FIGS. 14A, 14B, and 14C are diagrams (first diagrams) illustrating screen display examples. In the example of FIG. 14C, icons 131-1 to 131-3 and the like are set that are associated with the types of the AR content (for example, text, image, and hand writing) and the like. The types of the icon are not limited to the example of FIG. 14C.

In the example of FIG. 14A, AR contents 120-1 to 120-3 that correspond to detailed display are displayed on the arrangement-enabled area 102-1. In addition, the icons 131-1 to 131-3 that correspond to the types of the AR content are displayed on the arrangement-enabled area 102-2. In the embodiment, for example, the icon is displayed when the display area of the AR content of the original detailed information is larger than the arrangement-enabled area 102-2 by a certain threshold value or more, or is overlapped with the arrangement-disabled area 103-1 or the like, but the embodiment is not limited to such a case. For example, setting of whether or not the icon is displayed may be performed by the user or the like at the time of setting of the AR content.

In addition, when one (for example, the icon 131-1) of the icons 131-1 to 131-3 that are displayed on the arrangement-enabled area 102-2 is selected by the user, as illustrated in FIG. 14B, detailed information 132-1 that corresponds to the selected icon may be displayed. In addition, not the icon 131, but the AR content that has been displayed so as to be reduced is displayed so as to be enlarged through selection by the user. The AR content that has been displayed in detail as described above and the AR content that displayed so as to be enlarged are displayed on the arrangement-disabled area, but the display of the AR content is controlled by a permission (selection) of the user, so that the visual recognition is not hindered. In addition, the display of the AR content that has been displayed in detail, and the AR content that has been displayed so as to be enlarged is deleted, and the AR content is returned to the original image after the displayed portion of the AR content has been selected by the user, or a certain time period (for example, 10 seconds) has elapsed.

As described above, in the embodiment, the existence of the AR content that corresponds to the marker ID of the AR marker is notified to the user through an icon or the like, and the detailed information may be displayed depending on selection by the user.

Figure 15A:
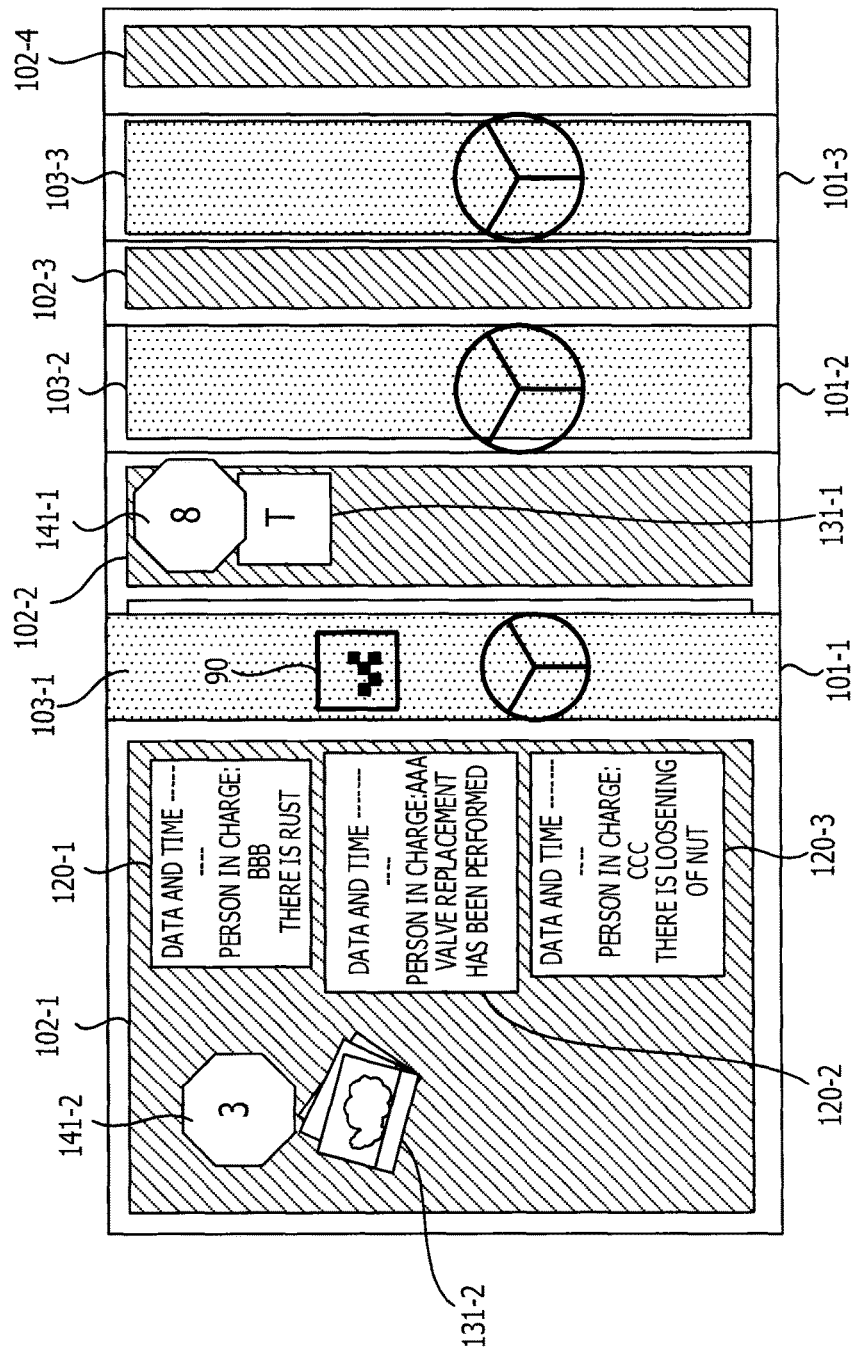
FIGS. 15A and 15B are diagrams (second diagrams) illustrating a screen display example.
Figure 15B:
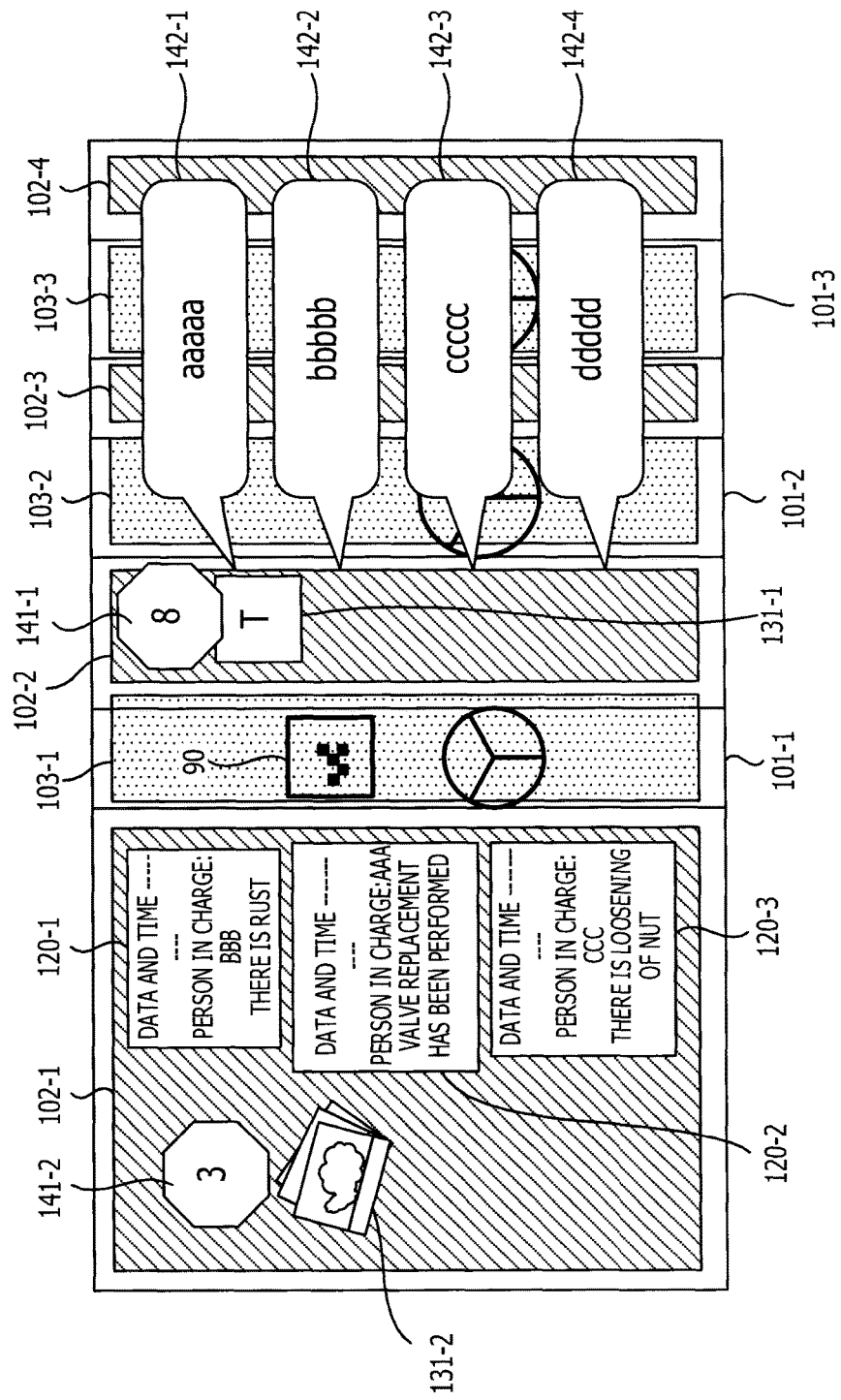

In the examples of FIGS. 15A and 15B, the display area controlling unit 37 aggregates a plurality of AR contents that is displayed within the projection area of the arrangement-enabled area, and displays the number of aggregated contents in the arrangement-enabled area. For example, as illustrated in FIG. 15A, the display area controlling unit 37 may perform message aggregation on the displayed AR contents, and display the number of aggregated contents on the screen. In the example of FIG. 15A, an AR content 141-1 that indicates eight aggregated contents is displayed for the icon 131-1, and an AR content 141-2 that indicates three aggregated contents is displayed for the icon 131-2.

Here, for example, as illustrated in FIG. 15B, AR contents 142 that corresponds to the eight messages are displayed by selecting the displayed portion (AR content 141-1) of the eight aggregated contents that correspond to the icon 131-1. The display area controlling unit 37 may display at least one (AR contents 142-1 to 142-4 in the example of FIG. 15B) of all of the aggregated messages (eight messages) in certain order (for example, the registered order or the like), but the embodiment is not limited to such a case.

In addition, even in the example of FIG. 15B, it is assumed that the AR contents 142-1 to 142-4 are displayed on the arrangement-disabled area 103-3, but the display of the contents is controlled by a permission (selection) by the user, so that the visual recognition is not hindered. In addition, the display is deleted, and the image is returned to the original image after the displayed portions of the AR contents 142-1 to 142-4 have been selected by the user, or a certain time period (for example, 10 seconds) has elapsed. As described above, in the embodiment, for example, the aggregation information (message or the like) may be deployed and displayed by selecting the displayed portion of the aggregated contents through the user.

Figure 16A:
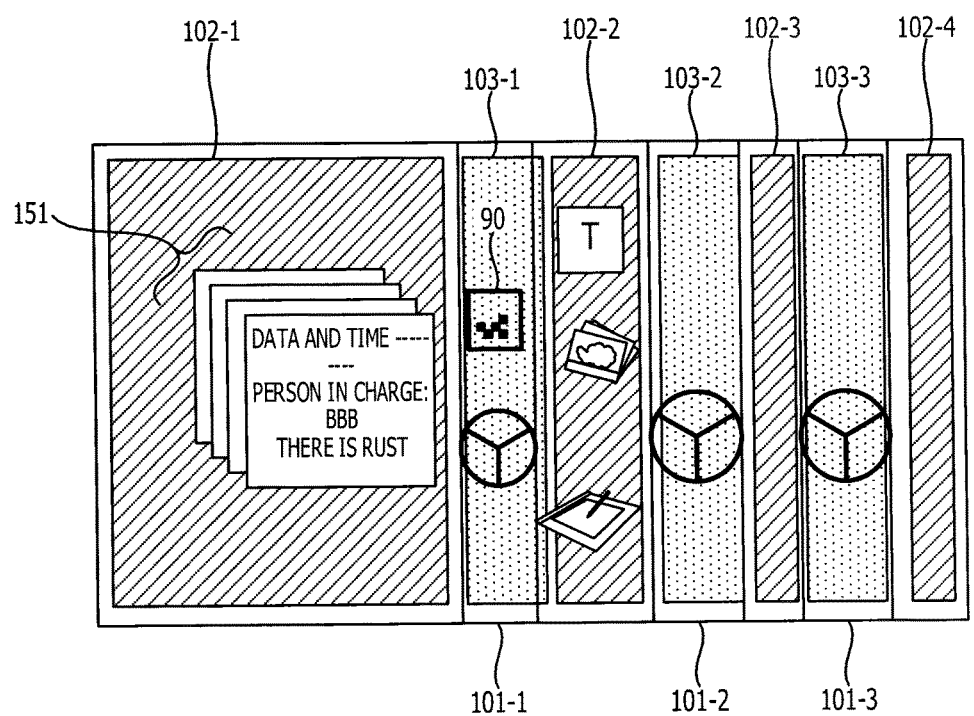
FIGS. 16A and 16B are diagrams (third diagrams) illustrating a screen display example.
Figure 16B:
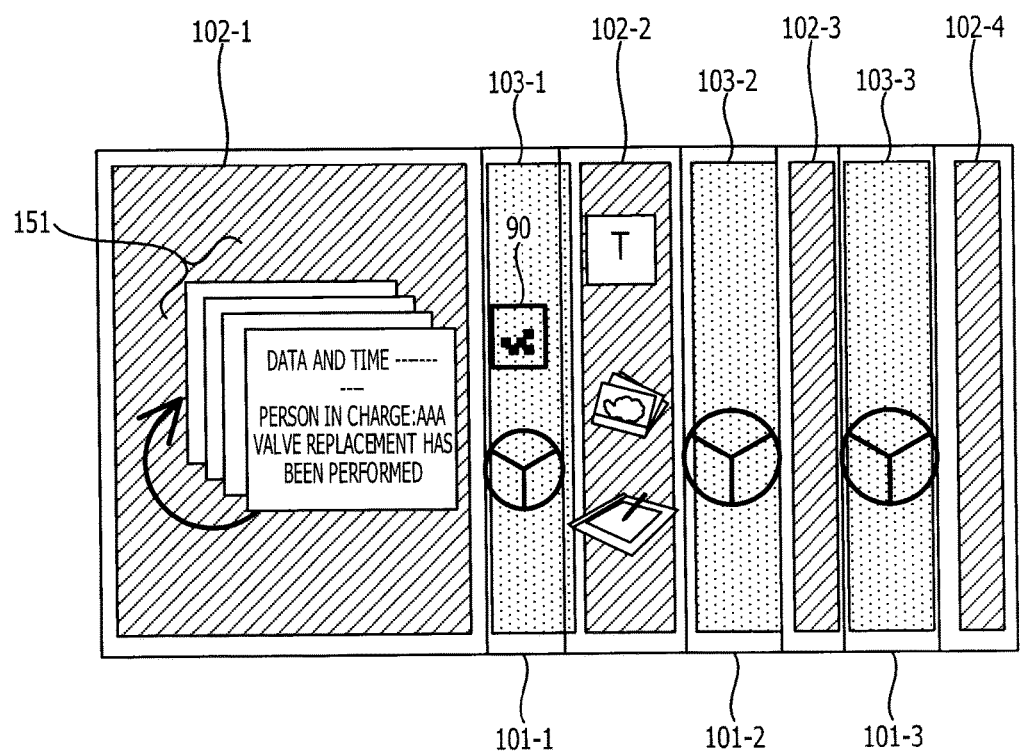

In the examples of FIGS. 16A and 16B, the display area controlling unit 37 displays the plurality of AR contents on the projection area of the arrangement-enabled area so as to overlap the AR contents with each other, in chronological order, changes the AR content on the front to a overlapped further AR content, through selection by the user, and displays the further contents. For example, as illustrated in FIG. 16A, when there is a plurality of AR contents that is displayed for the marker ID of the AR marker 90, the display area controlling unit 37 displays the contents on the arrangement-enabled area 102-1, as an AR content group 151. In this case, the display area controlling unit 37 sorts the AR contents that are included in the AR content group, in order of the registration, and displays the latest registered information on the front.

In addition, for example, when the user selects the displayed portion of the AR content group 151, the display area controlling unit 37 arranges the AR content that has been located on the front, at the end of the AR content group 151, as illustrated in FIG. 16B, and displays the second newest AR content on the front. As a result, pieces of information of the AR contents may be referred to, in chronological order, for each selection by the user.

As described above, in the embodiment, the existence of a plurality of AR contents may be notified to the user by the AR content group 151, and pieces of information may be referred to easily through selection by the user. In addition, in the example of FIG. 16, a plurality of AR contents may be referred to, in the arrangement-enabled area 102-1.

As described above, in the embodiment, superimposition display of display information may be performed appropriately. For example, in the embodiment, an arrangement-enabled area (first space), an arrangement-disabled area (second space), and the like of display information are defined by relative position coordinates, for a reference object. In addition, based on such definition information, appropriate superimposition display may be performed on the display information automatically without adjustment by the user by dynamically calculating an appropriate display area that corresponds to the position of the reference object and the visual point. For example, even when a large amount of display information is associated with at an identical position, the large amount of display information may be displayed without disturbing the visibility of a target object on which the user focuses attention. Thus, in the embodiment, it may be suppressed that visual recognition of further information is hindered due to display of the display information.

The embodiments are described above, but limitation to the certain embodiments is not performed, and various modifications and changes may be performed within the scope of the claims. In addition, a part or all of the above-described embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system, comprising:
 circuitry configured to:
 obtain an image;
 detect a first actual object in the image;
 obtain, from storage, space information indicating a first space in a three-dimensional coordinate system whose criterion is based on the first actual object;
 convert, in accordance with a first shape of the first actual object in the image, the space information into first area information corresponding to an arrangement enable area in which the first space is projected onto the image;
 obtain, from the storage, other space information indicating a second space in the three-dimensional coordinate system whose criterion is based on the first actual object, the second space being different from the first space;
 convert, in accordance with the first shape of the first actual object, the other space information into second area information corresponding to an arrangement disable area in which the second space is projected onto the image; and
 control, based on the first area information and the second area information when at least a part of the arrangement enable area is included in the arrangement disable area, a display to display a content in a third area within the arrangement enable area in the image, the third area not being included in the arrangement disable area, the content being associated with the actual object.

2. The system according to claim 1, wherein the circuitry is configured to:
 calculate a display position at which the content is projected onto the image, based on the first area information and an arrangement position of the content with reference to the first actual object and the first shape of the first actual object in the image;
 determine whether at least a part of the content overlaps the arrangement disable area, based on the display position and the second area information; and
 reduce a size of the content at a certain scaling factor when at least the part of the content overlaps the arrangement disable area.

3. The system according to claim 1, wherein the circuitry is configured to:
 calculate a display position at which the content is projected onto the image, based on the first area information and an arrangement position of the content with reference to the first actual object and the first shape of the first actual object in the image;
 determine whether at least a part of the content overlaps the arrangement disable area, based on the display position and the second area information; and
 control the display to display one of a thumbnail image and an icon image corresponding to the content on the third area in the image when at least the part of the content overlaps the arrangement disable area.

4. The system according to claim 3, wherein the circuitry is configured to display the content according to a selection from among the thumbnail image and the icon image.

5. The system according to claim 1, wherein the circuitry is configured to:
 count a number of a plurality of contents to be displayed in the arrangement enable area, the plurality of contents including the content; and
 control the display to display the number of the plurality of contents.

6. The system according to claim 5, wherein the circuitry is configured to:
 control the display to display at least a part of the plurality of contents, based on time information when the plurality of contents is generated; and
 control the display to display one content over other contents, the one content being selected by a user from among the plurality of contents.

7. The system according to claim 1, wherein the content includes information indicating a task to be performed corresponding to the first actual object.

8. The system according to claim 1, wherein the first actual object is a marker having at least one of a specific shape or pattern.

9. The system according to claim 1, further comprising: a communication device that includes:
- a camera configured to capture the image; and
- a communication interface configured to transmit the image to a device including the circuitry via a network.

10. The system according to claim 9, wherein the communication device includes the display configured to display the content and the image.

11. The system according to claim 1, wherein the system is a server.

12. The system according to claim 11, wherein the server includes:
- the circuitry; and
- a communication interface configured to receive the image from a communication device via a network and transmit the content to the communication device via the network.

13. A display control method executed by a computer, the display control method comprising:
- obtaining an image;
- detecting a first actual object in the image;
- obtaining, from storage, space information indicating a first space in a three-dimensional coordinate system whose criterion is based on the first actual object;
- converting, in accordance with a first shape of the first actual object in the image, the space information into first area information corresponding to an arrangement enable area in which the first space is projected onto the image;
- obtaining, from the storage other space information indicating a second space in the three-dimensional coordinate system whose criterion is based on the first actual object, the second space being different from the first space;
- converting, in accordance with the first shape of the first actual object, the other space information into second area information corresponding to an arrangement disable area in which the second space is projected onto the image; and
- controlling, based on the first area information and the second area information when at least a part of the arrangement enable area is included in the arrangement disable area, a display to display a content in a third area within the arrangement enable area in the image, the third area not being included in the arrangement disable area, the content being associated with the actual object.

14. The display control method according to claim 13, further comprising:
- calculating a display position at which the content is projected onto the image, based on the first area information and an arrangement position of the content with reference to the first actual object and the first shape of the first actual object in the image;
- determining whether at least a part of the content overlaps the arrangement disable area, based on the display position and the second area information; and
- reducing a size of the content at a certain scaling factor when at least the part of the content overlaps the arrangement disable area.

15. The display control method according to claim 13, further comprising:
- calculating a display position at which the content is projected onto the image, based on the first area information and an arrangement position of the content with reference to the first actual object and the first shape of the first actual object in the image;
- determining whether at least a part of the content overlaps the arrangement disable area, based on the display position and the second area information; and
- controlling the display to display one of a thumbnail image and an icon image corresponding to the content on the third area in the image when at least the part of the content overlaps the arrangement disable area.

16. The display control method according to claim 15, further comprising:
- displaying the content according to a selection from among the thumbnail image and the icon image.

17. The display control method according to claim 13, further comprising:
- counting a number of a plurality of contents to be displayed in the arrangement enable area, the plurality of contents including the content; and
- controlling the display to display the number of the plurality of contents.

18. A non-transitory computer-readable medium including a computer program which, when executed by a system, causes the system to perform a process comprising:
- obtaining an image;
- detecting a first actual object in the image;
- obtaining, from storage, space information indicating a first space in a three-dimensional coordinate system whose criterion is based on the first actual object;
- converting, in accordance with a first shape of the first actual object in the image, the space information into first area information corresponding to an arrangement enable area in which the first space is projected onto the image;
- obtaining, from the storage other space information indicating a second space in the three-dimensional coordinate system whose criterion is based on the first actual object, the second space being different from the first space;
- converting, in accordance with the first shape of the first actual object, the other space information into second area information corresponding to an arrangement disable area in which the second space is projected onto the image; and
- controlling, based on the first area information and the second area information when at least a part of the arrangement enable area is included in the arrangement disable area, a display to display a content in a third area within the arrangement enable area in the image, the third area not being included in the arrangement disable area, the content being associated with the actual object.

* * * * *